US009907008B2

(12) United States Patent
Want et al.

(10) Patent No.: US 9,907,008 B2
(45) Date of Patent: *Feb. 27, 2018

(54) CLOUD-COORDINATED LOCATION SYSTEM USING ULTRASONIC PULSES AND RADIO SIGNALS

(71) Applicant: Google Inc., Mountain View, CA (US)

(72) Inventors: Roy Want, Los Altos, CA (US); William Noah Schilit, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,820

(22) Filed: Mar. 21, 2017

(65) Prior Publication Data

US 2017/0195936 A1 Jul. 6, 2017

Related U.S. Application Data

(63) Continuation of application No. 14/961,029, filed on Dec. 7, 2015, now Pat. No. 9,609,482.

(51) Int. Cl.
*H04W 4/00* (2009.01)
*H04W 36/32* (2009.01)
(Continued)

(52) U.S. Cl.
CPC .......... *H04W 36/32* (2013.01); *H04W 12/06* (2013.01); *H04W 64/00* (2013.01); *H04L 67/42* (2013.01)

(58) Field of Classification Search
CPC ..... H04W 36/32; H04W 12/06; H04W 64/00; H04L 67/42
See application file for complete search history.

(56) References Cited

U.S. PATENT DOCUMENTS 7,441,631 B2 10/2008 Oh et al.
8,369,454 B2 * 2/2013 Tachi ................. H04L 7/06
375/316

(Continued)

FOREIGN PATENT DOCUMENTS

WO 9110919 7/1991

OTHER PUBLICATIONS

Andrew Martin Robert Ward, "Sensor-driven Computing", Corpus Christi College, University of Cambridge, Aug. 1998, 187 pgs.

(Continued)

*Primary Examiner* — Ajit Patel
(74) *Attorney, Agent, or Firm* — Shumaker & Sieffert, P.A.

(57) ABSTRACT

In general, this disclosure describes location techniques for a mobile device. A mobile device may request permission from a server device to perform a ranging operation. Responsive to receiving an indication of allowance, the mobile device may output a first data packet via a radio signal, which is received by a beacon device that activates an ultrasonic transponder upon receipt of the first data packet. The mobile device then outputs a second data packet via an ultrasonic pulse. The beacon device receives the ultrasonic pulse and outputs a third data packet via a second radio signal that includes information identifying the beacon device. The mobile device calculates a time difference between outputting the ultrasonic pulse and receiving the second radio signal and determines its location based on the third data packet and the time difference.

20 Claims, 8 Drawing Sheets

(51) Int. Cl.
*H04W 64/00* (2009.01)
*H04W 12/06* (2009.01)
*H04L 29/06* (2006.01)

(56) References Cited

U.S. PATENT DOCUMENTS

| | | | |
|---|---|---|---|
| 8,600,410 B2 | 12/2013 | Wager | |
| 2003/0086489 A1* | 5/2003 | Hernandez | H04B 1/7075 |
| | | | 375/239 |
| 2010/0156660 A1 | 6/2010 | Lee et al. | |
| 2011/0131197 A1 | 6/2011 | Nielsen et al. | |
| 2012/0025980 A1 | 2/2012 | Derks et al. | |
| 2013/0322214 A1 | 12/2013 | Neukirch et al. | |
| 2015/0147067 A1 | 5/2015 | Ryan et al. | |
| 2016/0142227 A1* | 5/2016 | Li | H04L 25/0226 |
| | | | 375/295 |

OTHER PUBLICATIONS

Balakrishnan et al., "Lessons from Developing and Deploying the Cricket Indoor Location System", MIT Computer Science and Artificial Intelligence Laboratory (CSAIL), Nov. 7, 2003, 15 pgs.

Savvides et al., "Localization in Sensor Networks" Chapter 15, pp. 327-349, 2004, 23 pgs. Applicant points out, in accordance with MPEP 609.04(a), that the year of publication, 2004, is sufficiently earlier than the effective U.S. filing date, Dec. 7, 2015, so that the particular month of publication is not in issue.

U.S. Appl. No. 14/961,029, filed Dec. 7, 2015 by Roy Want et al.

Prosecution History from U.S. Appl. No. 14/961,029 dated Aug. 10, 2016 through Nov. 17, 2017, 29 pp.

Invitation to Restrict or Pay Additional Fees from International Application No. PCT/US2016/064470, dated Mar. 17, 2017, 9 pp.

Frank Kohler et al., "An Energy-aware Indoor Positioning System for AAL Environments", 2010 International Conference on Indoor Positioning and Indoor Navigation (IPIN), Sep. 15-17, 2010, 7 pp.

International Search Report and Written Opinion of International Application No. PCT/US2016/064470, dated May 10, 2017, 19 pp.

Response to Written Opinion dated May 10, 2017, from International Application No. PCT/US2016/064470, filed Oct. 5, 2017, 16 pp.

Second Written Opinion of International Application No. PCT/US2016/064470, dated Nov. 9, 2017, 6 pp.

* cited by examiner

CLOUD-COORDINATED LOCATION SYSTEM USING ULTRASONIC PULSES AND RADIO SIGNALS

This application is a continuation of U.S. patent application Ser. No. 14/961,029, filed Dec. 7, 2015, the entire content of which is hereby incorporated by reference.

TECHNICAL FIELD

The disclosure relates to a position and location system for mobile computing devices.

BACKGROUND

In some location-based techniques for mobile computing devices, the mobile computing device may utilize received signal strength indications (RSSI) to determine a location of the mobile computing device when general global positioning system (GPS) satellites are obscured or unreliable. These techniques may be inaccurate and inefficient, as the positioning signals that are used by a mobile computing device are typically based on RSSI measurements originating from WiFi Access Points (APs) that are sparsely distributed. Accuracy can be improved by creating RSSI maps based on multiple APs, and further making this information available to the mobile computing device as a set of RSSI vectors to determine an approximate region in a building that matches all vectors for that location. RSSI measurements in the 2.45 GHz band, however, may be less reliable due to interference from other mobile computing devices and radios, and radio frequency (RF) noise (e.g. from microwave ovens). Measurement reliability issues may be further exacerbated further by multi-path interference from signal reflections that result in constructive and destructive interference, also known as Rayleigh fading, which, in turn, leads to RSSI measurements changing significantly when a mobile computing device moves only a few centimeters. RSSI mapping techniques typically have an accuracy of 10 meters, at best. Further, creating RSSI maps is very labor intensive, and the process must be repeated whenever objects in the environment are altered or moved.

SUMMARY

In one example, the disclosure is directed to a method including outputting, by a mobile computing device, a first radio signal that includes a first data packet, wherein the first data packet includes information indicating that the mobile computing device is requesting initiation of a ranging operation, after outputting the first radio signal, outputting, by the mobile computing device, an ultrasonic pulse that includes a second data packet, after outputting the ultrasonic pulse, receiving, by the mobile computing device, a third data packet via a second radio signal from a beacon device, wherein the third data packet includes information identifying the beacon device as a source of the third data packet, determining, by the mobile computing device, a time difference between outputting the ultrasonic pulse and receiving the second radio signal, and determining, by the mobile computing device and based at least in part on the third data packet and the time difference, a location of the mobile computing device.

In another example, the disclosure is directed to a mobile computing device comprising an ultrasonic transponder, a radio antenna, and one or more processors configured to output, via the radio antenna, a first radio signal that includes a first data packet, wherein the first data packet includes information indicating that the mobile computing device is requesting initiation of a ranging operation, after outputting the first radio signal, output, via the ultrasonic transponder, an ultrasonic pulse that includes a second data packet, after outputting the ultrasonic pulse, receive, via the radio antenna, a third data packet via a second radio signal from a beacon device, wherein the third data packet includes information identifying the beacon device as a source of the third data packet, determine a time difference between outputting the ultrasonic pulse and receiving the second radio signal, and determine, based at least in part on the third data packet and the time difference, a location of the mobile computing device.

In another example, the disclosure is directed to a computer-readable storage medium comprising instructions that, when executed, cause at least one processor of a mobile computing device to output a first radio signal that includes a first data packet, wherein the first data packet includes information indicating that the mobile computing device is requesting initiation of a ranging operation, after outputting the first radio signal, output an ultrasonic pulse that includes a second data packet, after outputting the ultrasonic pulse, receive a third data packet via a second radio signal from a beacon device, wherein the third data packet includes information identifying the beacon device as a source of the third data packet, determine a time difference between outputting the ultrasonic pulse and receiving the second radio signal, and determine, based at least in part on the third data packet and the time difference, a location of the mobile computing device.

In another example, the disclosure is directed to a method including receiving, by a beacon device using a radio antenna, a first radio signal that includes a first data packet, wherein the first radio signal is output by a mobile computing device, and wherein the first data packet includes information indicating that the mobile computing device is requesting initiation of a ranging operation, responsive to receiving the first radio signal that includes the first data packet, activating, by the beacon device, an ultrasonic transponder, receiving, by the beacon device using the ultrasonic transponder, an ultrasonic pulse that includes a second data packet, wherein the ultrasonic pulse is output by the mobile computing device, and responsive to receiving the second data packet, outputting, by the beacon device using the radio antenna, a third data packet via a second radio signal, wherein the third data packet includes information identifying the beacon device as a source of the third data packet.

In another example, the disclosure is directed to a beacon device comprising a deactivated ultrasonic transponder, a radio antenna, and one or more processors configured to receive, via the radio antenna, a first radio signal that includes a first data packet, wherein the first radio signal is output by a mobile computing device, and wherein the first data packet includes information indicating that the mobile computing device is requesting initiation of a ranging operation, responsive to receiving the first radio signal that includes the first data packet, activate the ultrasonic transponder, receive, via the ultrasonic transponder, an ultrasonic pulse that includes a second data packet, wherein the ultrasonic pulse is output by the mobile computing device, and responsive to receiving the second data packet, output, via the radio antenna, a third data packet via a second radio signal, wherein the third data packet includes information identifying the beacon device as a source of the third data packet.

In another example, the disclosure is directed to a computer-readable storage medium comprising instructions that, when executed, cause at least one processor of a beacon device to receive a first radio signal that includes a first data packet, wherein the first radio signal is output by a mobile computing device, and wherein the first data packet includes information indicating that the mobile computing device is requesting initiation of a ranging operation, responsive to receiving the first radio signal that includes the first data packet, activate an ultrasonic transponder, receive an ultrasonic pulse that includes a second data packet, wherein the ultrasonic pulse is output by the mobile computing device, and responsive to receiving the second data packet, output a third data packet via a second radio signal, wherein the third data packet includes information identifying the beacon device as a source of the third data packet.

In another example, the disclosure is directed to a method including receiving, by a server device and from a first mobile computing device, a first request to perform a ranging operation, receiving, by the service device and from a second mobile computing device, a second request to perform the ranging operation, determining, by the server device, a first starting time at which the first mobile computing device may perform the ranging operation, determining, by the server device, a second starting time at which the second mobile computing device may perform the ranging operation, wherein the second starting time is later than the first starting time, outputting, by the server device and to the first mobile computing device, a first indication that, at the first starting time, the first mobile computing device may perform the ranging operation, and outputting, by the server device and to the second mobile computing device, a second indication that, at the second starting time, the second mobile computing device may perform the ranging operation.

In another example, the disclosure is directed to a server device comprising a communication unit configured to receive, from a first mobile computing device, a first request to perform a ranging operation, and receive, from a second mobile computing device, a second request to perform the ranging operation, and one or more processors configured to determine a first starting time at which the first mobile computing device may perform the ranging operation, determine a second starting time at which the second mobile computing device may perform the ranging operation, wherein the second starting time is later than the first starting time, output, via the communication unit and to the first mobile computing device, a first indication that, at the first starting time, the first mobile computing device may perform the ranging operation, and output, via the communication unit and to the second mobile computing device, a second indication that, at the second starting time, the second mobile computing device may perform the ranging operation.

In another example, the disclosure is directed to a computer-readable storage medium comprising instructions that, when executed, cause at least one processor of a server device to receive, from a first mobile computing device, a first request to perform a ranging operation, receive, from a second mobile computing device, a second request to perform the ranging operation, determine a first starting time at which the first mobile computing device may perform the ranging operation, determine a second starting time at which the second mobile computing device may perform the ranging operation, wherein the second starting time is later than the first starting time, output, to the first mobile computing device, a first indication that, at the first starting time, the first mobile computing device may perform the ranging operation, and output, to the second mobile computing device, a second indication that, at the second starting time, the second mobile computing device may perform the ranging operation.

In another example, the disclosure is directed to a method comprising receiving, by a server device and from a first mobile computing device, a first request to perform a ranging operation, receiving, by the service device and from a second mobile computing device, a second request to perform the ranging operation, determining, by the server device, a first starting time at which the first mobile computing device may perform the ranging operation, at the first starting time, outputting, by the server device and to the first mobile computing device, a first indication that the first mobile computing device may perform the ranging operation, after outputting the first indication, receiving, by the server device and from the first mobile computing device, a second indication that the first mobile computing device has completed the ranging operation, and responsive to receiving the second indication, at a second starting time, outputting, by the server device and to the second mobile computing device, a third indication that the second mobile computing device may perform the ranging operation.

In another example, the disclosure is directed to a server device comprising a communication unit configured to receive, from a first mobile computing device, a first request to perform a ranging operation, and receive, from a second mobile computing device, a second request to perform the ranging operation, and one or more processors configured to determine a first starting time at which the first mobile computing device may perform the ranging operation, at the first starting time, output, to the first mobile computing device, a first indication that the first mobile computing device may perform the ranging operation, after outputting the first indication, receive, from the first mobile computing device, a second indication that the first mobile computing device has completed the ranging operation, and responsive to receiving the second indication, at a second starting time, output, to the second mobile computing device, a third indication that the second mobile computing device may perform the ranging operation.

In another example, the disclosure is directed to a computer-readable storage medium comprising instructions that, when executed, cause at least one processor of a server device to receive, from a first mobile computing device, a first request to perform a ranging operation, receive, from a second mobile computing device, a second request to perform the ranging operation, determine a first starting time at which the first mobile computing device may perform the ranging operation, at the first starting time, output, to the first mobile computing device, a first indication that the first mobile computing device may perform the ranging operation, after outputting the first indication, receive, from the first mobile computing device, a second indication that the first mobile computing device has completed the ranging operation, and responsive to receiving the second indication, at a second starting time, output, to the second mobile computing device, a third indication that the second mobile computing device may perform the ranging operation.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
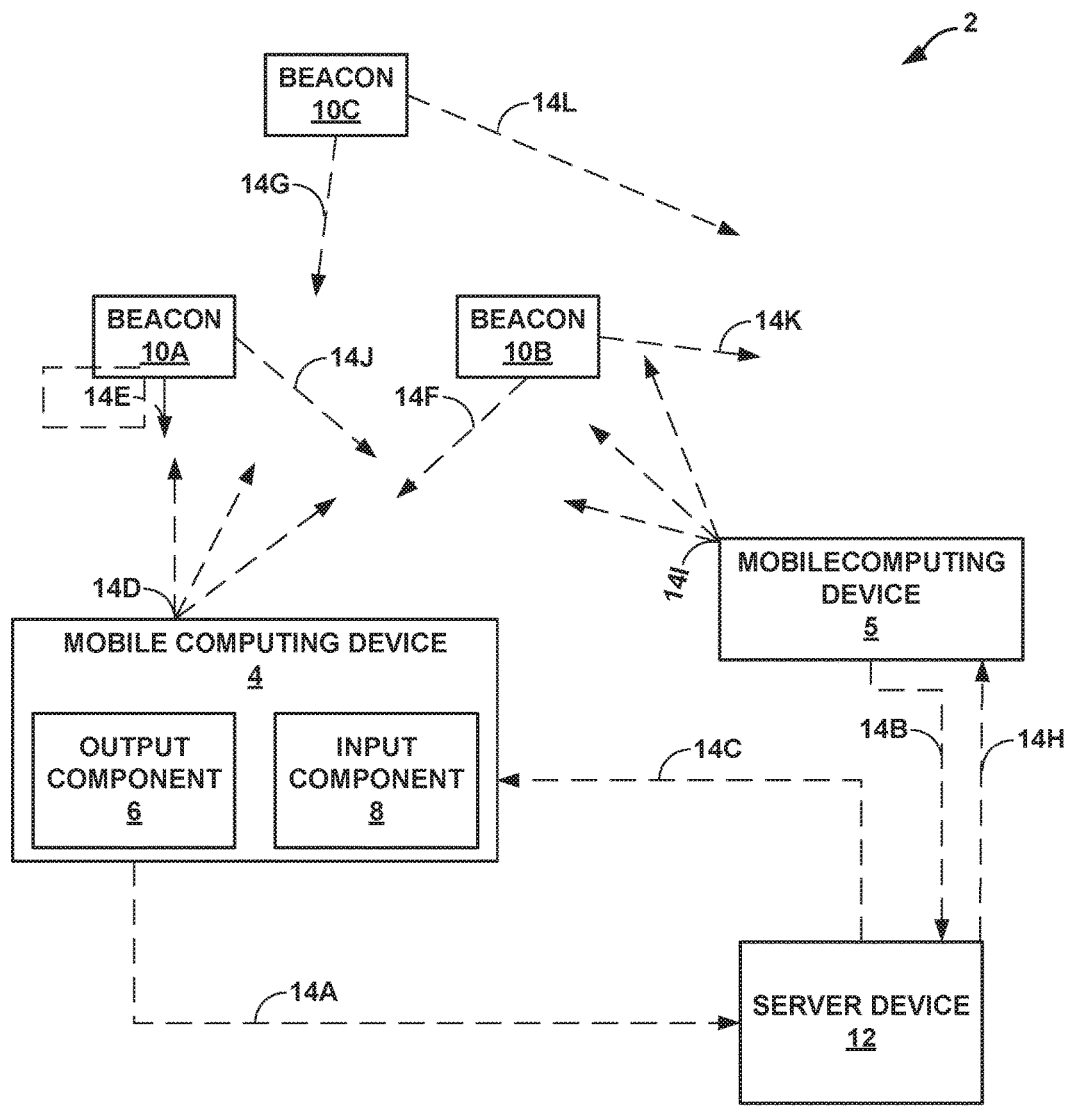
FIG. 1 is a block diagram illustrating an example of communications between a mobile computing device, a server device, and a plurality of beacon devices during the process of the mobile computing device performing a ranging operation, in accordance with one or more techniques of this disclosure.

In general, this disclosure describes location techniques for a mobile computing device. A mobile computing device may request permission from a server device to perform a ranging operation. Responsive to receiving an indication of allowance, the mobile computing device may output a first data packet via a radio signal, which is received by a beacon device that activates an ultrasonic transponder upon receipt of the first data packet. The mobile computing device then outputs a second data packet via an ultrasonic pulse. The beacon device receives the ultrasonic pulse and outputs a third data packet via a second radio signal that includes information identifying the beacon device. The mobile computing device calculates a time difference between outputting the ultrasonic pulse and receiving the second radio signal and determines its location based on the third data packet and the time difference. In some examples, the location determined as a result of the ranging operation may be an approximate location, a range of the mobile computing device from the beacon device, or a room or general area of a building.

By first sending a request to a centralized server responsible for issuing permissions to perform ranging operations, a mobile computing device may perform the ranging operation in an environment with less traffic and signal contention or packet collision. Rather than allowing mobile computing devices to freely perform the ranging operations described herein, organizing the mobile computing devices into a queue may result in more accurate, precise, and timely locations determined for the mobile computing device. Further, by configuring the mobile computing device to only output an ultrasonic pulse rather than outputting and receiving an ultrasonic pulse, the digitizing circuit and the processor receiving and decoding the signals received by the ultrasonic transponder (e.g., a microphone) are not necessarily required to be active for long periods of time. This configuration may reduce battery consumption for the mobile computing device. Further, the time it takes the radio signal to travel from the beacon device to the ultrasonic device may, in many cases, be negligible, so timing information may not be needed at the beacon device. Instead, data packets transferred between the mobile computing device and the beacon device may only include identification information, thereby possibly reducing data consumption and processing speeds.

In many cases, ultrasound can be generated and received using modern smartphones. By making use of the differential Time of Flight (ToF) of RF and ultrasound, range can be estimated. In some cases, devices emit a burst of ultrasound and an RF packet at the same time. Mobile computing devices, some distance away, receive both, but the sound arrives after the RF packet. As a result, smartphones may need to continuously listen for both RF and audio/ultrasound signals from nearby devices. Leaving the microphone active in these smartphones may also result in increased background power consumption. Also, by first sending a radio signal to the beacon device to activate the ultrasonic transponder at the beacon device, techniques described herein may reduce battery consumption at the beacon device. Furthermore, similar to the mobile computing device, the ultrasonic transponder of the beacon device is not necessarily required to be active for long periods of time, which may further reduce battery consumption for the beacon device.

FIG. 1 is a block diagram illustrating an example of communications between a mobile computing device 4, a server device 12, and a plurality of beacon devices 10A-10C (collectively, beacon devices 10) during the process of mobile computing device 4 performing a ranging operation, in accordance with one or more techniques of this disclosure. Mobile computing device 4 is described below as a smartphone. However, in some examples, mobile computing device 4 may be a computerized watch (e.g., a smart watch), computerized eyewear, computerized headwear, other types of wearable computing devices, a tablet computer, a personal digital assistant (PDA), a laptop computer, a gaming system, a media player, an e-book reader, a television platform, an automobile navigation system, a digital camera, or any other type of mobile and/or non-mobile computing device that is configured to perform a ranging operation as described herein.

Mobile computing device 4 may include one or more output components 6 and one or more input components 8. Output component 6, in some examples, is configured to provide output to a user using tactile, audio, or video stimuli. Output component 6, in one example, includes an electronic display, a loudspeaker, or any other type of device for converting a signal into an appropriate form understandable to humans or machines. The electronic display may be a liquid crystal display (LCD) or organic light-emitting diode (OLED) part of a touch screen, may be a non-touchscreen direct view display component such as a cathode ray tube (CRT), light-emitting diode (LED), LCD, or OLED. The display component may also be a projector instead of a direct view display. Output component 6 may also include a structure capable of outputting a radio signal and a structure capable of outputting an ultrasonic pulse. For instance, output component 6 may include an RF modulator, an RF transmitter, a radio antenna (either external or internal), a signal generator, or a radio amplifier, among other things. Further, output component 6 may include an ultrasonic transponder, an ultrasonic transducer, an ultrasonic sensor, or an ultrasonic transmitter, among other things.

Input component 8, in some examples, is configured to receive input from a user through tactile, audio, or video feedback. Examples of input component 8 include a display component, a mouse, a keyboard, a camera, a microphone or any other type of device for detecting input from a user. In some examples, a display component includes a touch-sensitive screen. Input component 8 may also include a structure capable of receiving a radio signal. For instance, input component 8 may include a radio antenna, a radio receiver, a communication receiver, or a scanner, among other things.

Beacons are hardware devices that include at least a component to receive and output radio signals, such as Bluetooth low energy signals, as well as a component to receive ultrasonic signals. Beacon devices 10 may be one of a plurality of beacons spread throughout a space, such as a retail space, an office space, or any other type of building. Each of beacon devices 10 may include beacon-specific information, such as an identification number, a name, and/or a location within the building. Beacon devices 10 may be capable of transmitting this beacon-specific information to various mobile computing devices, such as mobile computing device 4, via the radio signal output.

In instances of this disclosure, ultrasound pulses are utilized. Ultrasounds are sound waves with frequencies higher than the upper audible limit of human hearing. Ultrasound is not different from 'normal' (audible) sound in its physical properties, only in that humans cannot hear it. This limit varies from person to person and is approximately 20 kilohertz (20,000 hertz) in healthy, young adults. Ultrasound devices operate with frequencies from 20 kHz up to several megahertz. The principle behind a pulsed-ultrasonic technology is that the transmit signal consists of short bursts of ultrasonic energy. After each burst, the electronics looks for a return signal within a small window of time corresponding to the time it takes for the energy to pass through the vessel. Only a signal received during this window will qualify for additional signal processing.

In other instances of this disclosure, radio signals are utilized. Radio is the radiation (wireless transmission) of electromagnetic energy through space. Radio waves may be used to carry information, such as sound, by systematically changing (modulating) some property of the radiated waves, such as their amplitude, frequency, phase, or pulse width. When radio waves strike an electrical conductor, the oscillating fields induce an alternating current in the conductor. The information in the waves can be extracted and transformed back into its original form. Radio systems may utilize a transmitter to modulate (change) some property of the energy produced to impress a signal on it, for example using amplitude modulation, angle modulation (which can be frequency modulation or phase modulation). Radio systems may also utilize an antenna to convert electric currents into radio waves, and vice versa. An antenna can be used for both transmitting and receiving. The electrical resonance of tuned circuits in radios allow individual frequencies to be selected. The electromagnetic wave is intercepted by a tuned receiving antenna. A radio receiver receives its input from an antenna and converts it into a form usable for the consumer, such as sound, pictures, digital data, measurement values, navigational positions, etc. Radio frequencies occupy the range from a 3 kHz to 300 GHz.

Server 12 may be a computer program or a machine capable of accepting requests from clients, such as mobile computing device 4, and responding to them. Server 12 may be any of database servers, file servers, mail servers, print servers, web servers, game servers, and application servers, among other types of servers. Server 12 may consist of a single computing device or a cluster of two or more computing devices working in tandem. Server 12 may be a cloud-based server. Server 12 may perform network management server functions which perform administrative tasks. Among other things, server 12 may maintain a queue of computing devices requesting to perform a ranging operation, as described herein, and be responsible for adding computing devices to the queue upon receiving indications of requests to perform the ranging operation, as well as dequeueing the computing devices upon issuing an indication that the computing device may perform the ranging operation.

In accordance with techniques of this disclosure, mobile computing device 4 may output a first request 14A to perform a ranging operation that is received by server 12. For instance, a user of mobile computing device 4 may be in a shopping mall and wants to perform a ranging operation. In such instances, the user may, either explicitly or implicitly through the instantiation of an application that utilizes location functions, provide input to mobile computing device 4 that causes mobile computing device 4 to send request 14A to server 12.

Computing device 5 may output a second request 14B to perform the ranging operation that is received by server 12. For instance, a user of computing device 5 may also want to perform the ranging operation in the same shopping mall as the user of mobile computing device 4. For instance, a user of mobile computing device 4 may be in a shopping mall and wants to perform a ranging operation. In such instances, the user may, either explicitly or implicitly through the instantiation of an application that utilizes location functions, provide input to computing device 5 that causes computing device 5 to send request 14B to server 12.

In some examples, to achieve scalability, the requests to server device 12 may include a coarse-grained location. The coarse-grained location may be determined through use of a GPS, a cellular tower RSSI, or a WiFi RSSI. This may allow server device 12 to maintain a queue of requests for a particular region. As such, server device 12 may maintain a queue for a region, a city, a neighborhood, or a tile of a map. Further, if beacon devices in this system periodically transmit a unique Bluetooth identification, the beacons themselves may provide a way of indicating a coarse-grained location.

Server 12 may determine a first starting time at which mobile computing device 4 may perform the ranging operation. In some instances, since mobile computing device 4 requested to perform the ranging operation before computing device 5, server 12 may determine that mobile computing device 4 should be able to perform the ranging operation before computing device 5. In other instances, server 12 may base the priority decision based on information other than time, such as the type of computing device making the request, inherent priority information associated with the computing device, or the application operating on the computing device making the request, among other things.

Server 12 may output, to mobile computing device 4, a first indication 14C that, at the first starting time, mobile computing device 4 may perform the ranging operation. For instance, during the time that server 12 determines mobile computing device 4 may perform the ranging operation, server 12 may output indication 14C to mobile computing device 4 that notifies mobile computing device 4 that it may perform the ranging operation. In some instances, the first indication may include a window of time during which mobile computing device 4 may perform the ranging operation. In such instances, mobile computing device 4 must either initiate the ranging operation or re-send a request to server 12 to perform the ranging operation.

Responsive to receiving indication 14C, mobile computing device 4 may output ultrasonic pulse 14D that includes instances of a data packet. The data packet may include information identifying mobile computing device 4 as the source of ultrasonic pulse 14D. Mobile computing device 4 may output ultrasonic pulse 14D via output component 6, such as via an ultrasonic transponder of output component 6 in mobile computing device 4.

Each of beacon devices 10A-10C may be configured to receive ultrasonic pulse 14C. Responsive to receiving ultrasonic pulse 14D, each of beacon devices 10A-10C may output a respective radio signal 14E-14G. Each respective radio signal 14E-14G may include a data packet with information that identifies the respective beacon device 10A-10C as the source of the data packet. For instance, beacon device 10A may receive ultrasonic pulse 14D output by mobile computing device 4. Responsive to receiving this ultrasonic pulse, beacon device 10A may output radio signal 14E with a data packet that includes information identifying beacon device 10A as the source of radio signal 14E and the data packet included in radio signal 14E. The identifying information may include an identification number of beacon device 10A, a name of beacon device 10A, and/or a location of beacon device 10A within the building.

Mobile computing device 4 may receive each of radio signals 14E-14G, each of which include the identifying information of beacon devices 10A-10C. Mobile computing device 4 may receive each of these radio signals 14E-14G using input component 8. Once radio signals 14E-14G are received, mobile computing device 4 may determine a respective time difference between outputting ultrasonic pulse 14D and receiving each of radio signals 14E-14G. For instance, mobile computing device 4 may store a time that mobile computing device 4 outputs ultrasonic pulse 14D. Mobile computing device 4 may also store a time that mobile computing device 4 receives radio signal 14E. In some examples, the data packets of radio signals 14E-14G may include further information used in the ranging operation. For instance, the data packet may include a field containing a random time delay that specifies the random amount of time the packet was purposely delayed by the beacon to avoid colliding with the packets of other beacons that have heard the ultrasonic pulse. The data packet may also include a temperature and a humidity measured by sensors in each of beacon devices 10A-10C. This is because the speed of sound in air is mainly dependent on the temperature and humidity (Speed of Sound in Air=331.3+ 0.606*Temperature+1.5 (Humidity-%)). Mobile computing device 4 may then take a difference between the time mobile computing device 4 outputted ultrasonic pulse 14D and the time mobile computing device 4 received radio signal 14E. In some instances, this process may be repeated for each of radio signals 14F and 14G.

Based at least in part on the identifying information in the data packets of radio signals 14E-14G and the time differences calculated above, mobile computing device 4 may determine a location of mobile computing device 4. For instance, given the time difference, mobile computing device 4 may multiply the time difference by an output speed of the ultrasonic pulse to determine a distance radius. In some examples, the output speed is a constant output speed. In other examples, the output speed is determined based on a temperature and a humidity, or any other factor that may influence the speed of the ultrasonic pulse through air. Mobile computing device 4 may further determine a location of beacon device 10A based on the identifying information in the data packet of radio signal 14E. Using the location of the beacon and the distance radius, mobile computing device 4 may determine an approximate location of mobile computing device 4 as a circle around beacon device 10A with a radius equal to the distance radius. In some instances, mobile computing device 4 may repeat the process for beacon devices 10B and 10C. With three determined distance radii, mobile computing device 4 may trilaterate the approximate locations to determine an actual location of mobile computing device 4.

In some instances, mobile computing device 4 may notify server 12 once the ranging operation is complete. In other instances, server 12 may assume the ranging operation is complete once the predetermined time window has passed. Nonetheless, server 12 may determine a second starting time at which computing device 5 may perform the ranging operation with the second starting time is later than the first starting time. Server 12 may output indication 14H to computing device 5, with indication 14H notifying computing device 5 that, at the second starting time, computing device 5 may perform the ranging operation.

Responsive to receiving indication 14H to perform the ranging operation, computing device 5 may repeat the steps above described with respect to mobile computing device 4 to perform the ranging operation. In other words, computing device 5 may output ultrasonic pulse 14I, which is received by each of beacon devices 10A-10C. Responsive to receiving ultrasonic pulse 14I, beacon devices 10A-10C may output radio signals 14J-14L. Computing device 5 may receive radio signals 14J-14L, determine a time difference between receiving ultrasonic pulse 14I and each of radio signals 14J-14L, and determine a location of computing device 5 based on the time differences and the identifying information in each of radio signals 14J-14L.

By first sending a request to centralized server 12 responsible for issuing permissions to perform ranging operations, mobile computing device 4 may perform the ranging operation in an environment with less traffic and signal contention or packet collision. Rather than allowing mobile devices to freely perform the ranging operations described herein, organizing the mobile devices into a queue may result in more accurate, precise, and timely locations determined for mobile computing device 4. Further, by configuring mobile computing device 4 to only output an ultrasonic pulse rather than outputting and receiving an ultrasonic pulse, the digitizing circuit and the processor receiving and decoding the signals received by the ultrasonic transponder (e.g., a microphone) are not required to be active for long periods of time. This may reduce privacy concerns and battery consumption for mobile computing device 4. In some examples, mobile computing device 4 may not need to include a microphone at all, removing privacy concerns relating to eavesdropping on mobile computing device 4. Further, the time it takes the radio signal to travel from the beacon device to computing device 10 is negligible relative to the time it takes the ultrasonic pulse to travel from mobile device to beacon, so no timing information is necessarily required to be present in the data packets. Instead, data packets transferred between mobile computing device 4 and beacon device 10 may only include identification information, thereby possibly reducing data consumption and processing speeds. Accuracy can be further improved by including the temperature and humidity of the local environment, as well as any random time delay added at beacon device 10.

Throughout the disclosure, examples are described where a computing device and/or a computing system may analyze information (e.g., locations, speeds) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed), or to dictate whether and/or how to the computing device may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Figure 2:
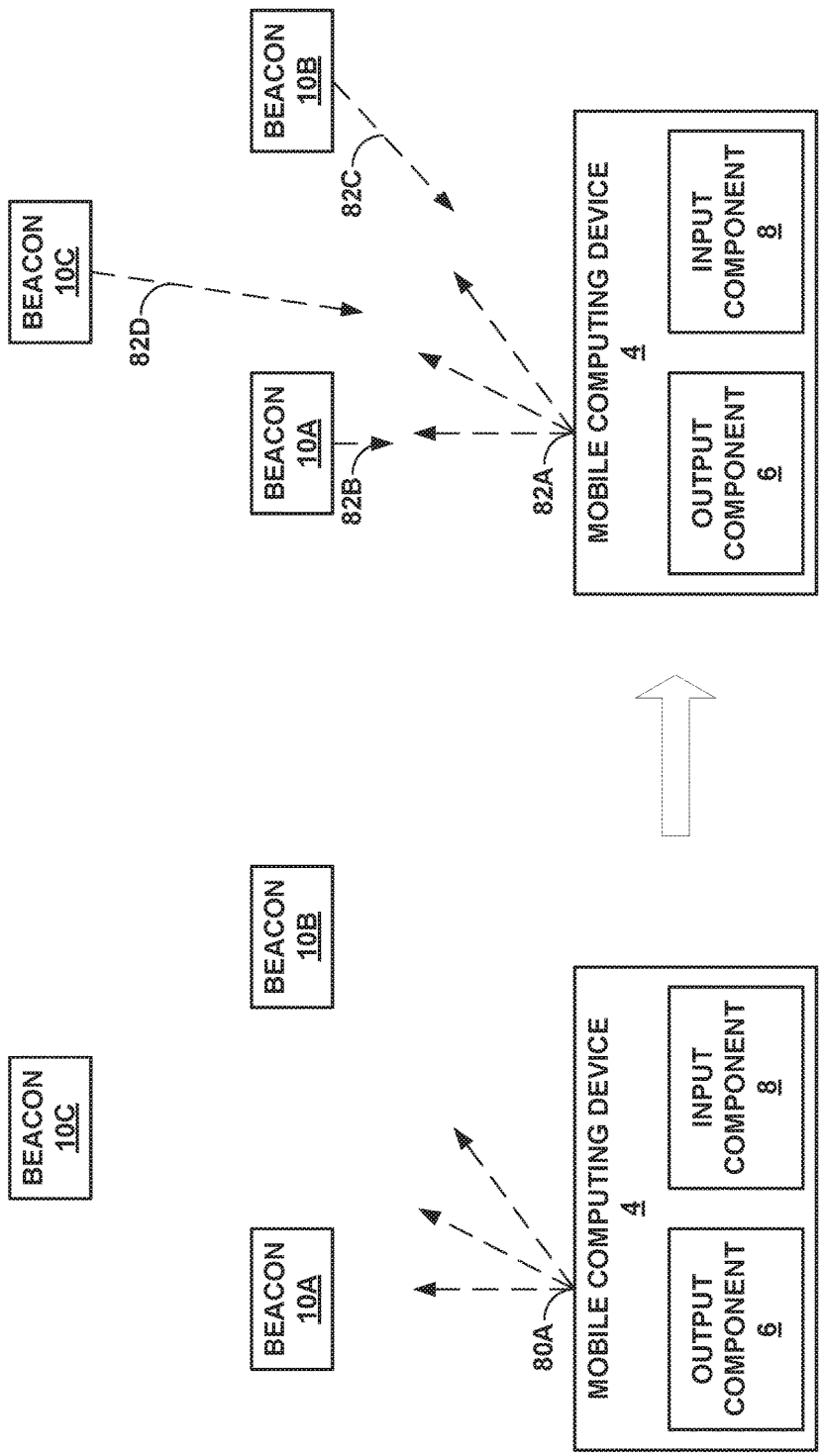
FIG. 2 is a block diagram illustrating another example of communications between a mobile computing device and a plurality of beacon devices during the process of the mobile computing device performing a ranging operation, in accordance with one or more techniques of this disclosure.

FIG. 2 is a block diagram illustrating another example of communications between mobile computing device 4 and beacon devices 10 during the process of mobile computing device 4 performing a ranging operation, in accordance with one or more techniques of this disclosure. While techniques described with respect to FIG. 2 are shown separately from the techniques described with respect to FIG. 1, it should be recognized that example techniques of this disclosure include both the techniques described with regards to FIG. 1 and the techniques described with regards to FIG. 2 in the same instance.

In the example of FIG. 2, mobile computing device 4 may be one example of mobile computing device 4 shown in FIG. 1. As such, mobile computing device 4 may be configured to perform the ranging operation described in accordance with the techniques of this disclosure. Beacon devices 10A-10C may be utilized by mobile computing device 4 to assist with the ranging operation. In the example of FIG. 1, each of beacon devices 10A-10C may include a component configured to receive and interpret ultrasonic pulses output by mobile computing device 4. However, in some examples, requiring beacon devices 10A-10C to constantly supply power to such a component may lead to inefficient battery consumption. Further, as ultrasonic pulses are physically similar to sound waves, including a component that constantly receives and analyzes sound waves may lead to certain privacy concerns.

As such, in the example of FIG. 2 and in accordance with techniques of this disclosure, each of beacon devices 10A-10C may include a deactivated ultrasonic transponder. Prior to performing a ranging operation, mobile computing device 4 may first output radio signal 80A that includes a first data packet. The first data packet may include information indicating that mobile computing device 4 is requesting initiation of the ranging operation. Radio signal 80A may be received by each of beacon devices 10A-10C. Responsive to receiving radio signal 80A, each of beacon devices 10A-10C may activate the deactivated ultrasonic transponder, enabling the ultrasonic transponder to receive and interpret any ultrasonic pulses outputted by mobile computing device 4. Generally, a component configured to receive a radio signal requires less power than a component configured to receive an ultrasonic pulse by listening for a radio signal for a very short period of time (e.g., about 1 mS per second) and deactivating for a relatively longer period of time (e.g., ~950 mS). As such, configuring beacon devices 10A-10C to receive radio signal 80A prior to activating the ultrasonic transponder that may receive an ultrasonic pulse from mobile computing device 4 may improve the privacy and battery efficiency of beacon devices 10A-10C.

After outputting radio signal 80A, mobile computing device 4 may perform the ranging operation described above with respect to FIG. 1. Specifically, mobile computing device 4 may output ultrasonic pulse 82A that includes a second data packet. Beacon devices 10A-10C may receive ultrasonic pulse 82A and, responsive to receiving ultrasonic pulse 82A, may output radio signals 82B-82D. Each of radio signals 82B-82D may include a respective data packet that identifies the respective beacon device 10A-10C as the source of radio signals 82B-82D. In some examples, after outputting radio signals 82B-82D, each of beacon devices 10A-10C may deactivate the ultrasonic transponder in an effort to conserve battery power and preserve privacy.

Mobile computing device 4 may be configured to receive each of radio signals 82B-82D from beacon devices 10A-10C, determine a time difference between outputting ultrasonic pulse 82A and receiving each of radio signals 82B-82D, and determine a location of mobile computing device 4 based on the time differences and the identifying information in each of radio signals 82B-82D. In some instances, such as when multiple computing devices are attempting to perform the ranging operation at approximately the same time, the data packets included in ultrasonic pulse 82A may include information identifying mobile computing device 4 as the source of ultrasonic pulse 82A. When beacon devices 10A-10C output radio signals 82B-82D, the data packets in radio signals 82B-82D that includes identifying the respective beacon devices 10A-10C as the source of radio signals 82B-82D may further include the information identifying mobile computing device 4. In other words, beacon devices 10A-10C may be configured to include information identifying the intended recipient of the respective radio signal, reducing any instances where multiple computing devices that perform ranging operations at approximately the same time utilize radio signals intended for other computing devices when attempting to determine their respective location.

By first sending a radio signal to beacon devices 10A-10C to activate the ultrasonic transponder at beacon devices 10A-10C, techniques described herein may reduce battery consumption at beacon devices 10A-10C. Further, by configuring mobile computing device 4 to only output an ultrasonic pulse rather than outputting and receiving an ultrasonic pulse, the digitizing circuit and the processor receiving and decoding the signals received by the ultrasonic transponder (e.g., a microphone) are not necessarily required to be active for long periods of time. This may reduce privacy concerns and battery consumption for mobile computing device 4. Further, the time it takes the radio signal to travel from beacon device 10 to mobile computing device 4 is negligible, so no timing information is necessarily required to be present in the data packets. Instead, data packets transferred between mobile computing device 4 and beacon devices 10A-10C may only include identification information, thereby possibly reducing data consumption and processing speeds. Finally, similarly to mobile computing device 4, the ultrasonic transponder of beacon devices 10A-10C is not required to be active for long periods of time. This may further reduce privacy concerns and battery consumption for beacon device 10. In some examples, mobile computing device 4 may not need to include a microphone at all, removing privacy concerns relating to eavesdropping on mobile computing device 4.

Throughout the disclosure, examples are described where a computing device and/or a computing system may analyze information (e.g., locations, speeds) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Figure 3:
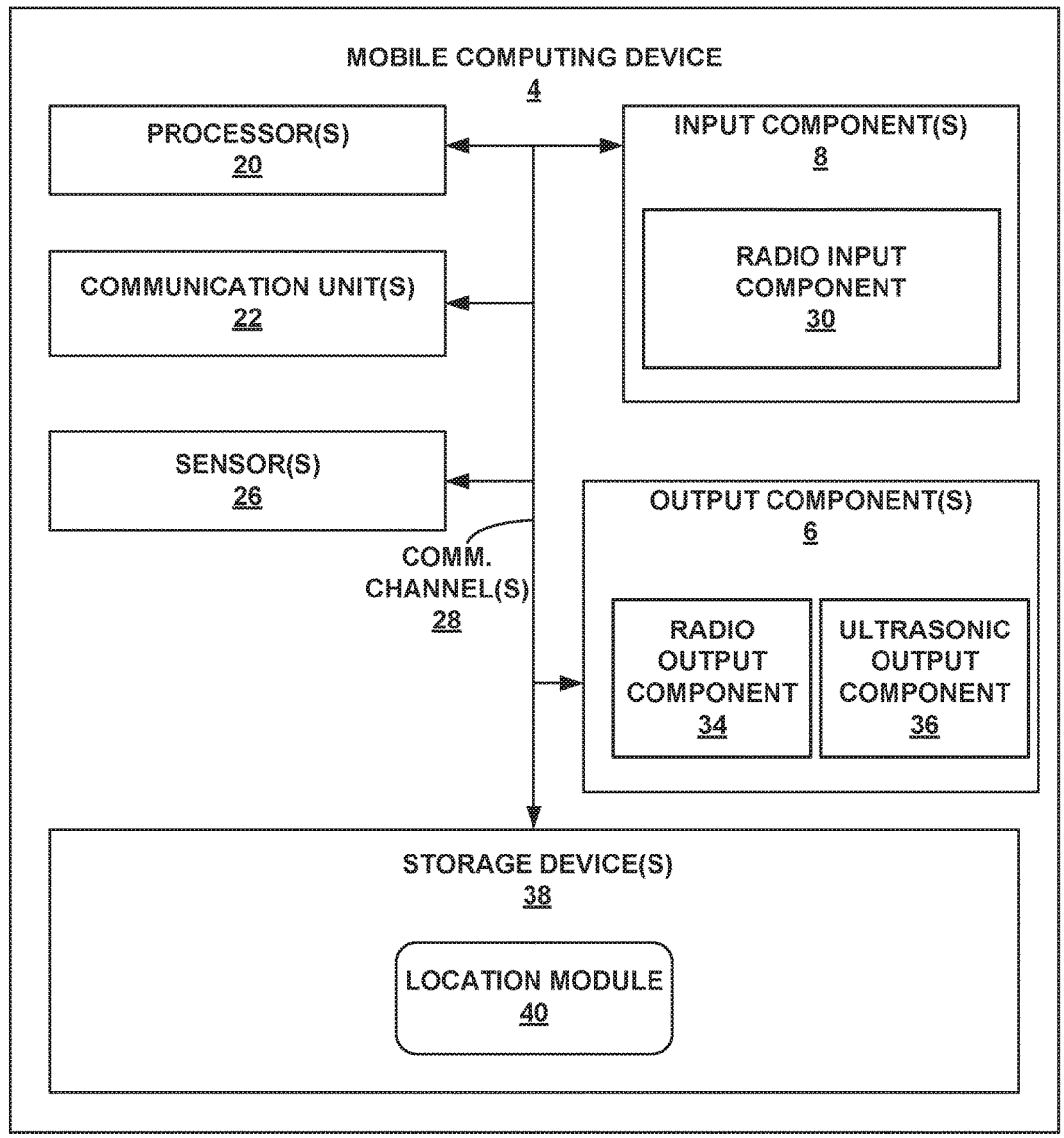
FIG. 3 is a block diagram illustrating an example mobile computing device, in accordance with one or more techniques of this disclosure.

FIG. 3 is a block diagram illustrating an example of mobile computing device 4, in accordance with one or more techniques of this disclosure. Mobile computing device 4 of FIG. 3 is described below as one particular example of mobile computing device 4 shown in FIGS. 1 and 2. FIG. 3 illustrates only one particular example of mobile computing device 4, and many other examples of mobile computing device 4 may be used in other instances and may include a subset of the components included in example mobile computing device 4 or may include additional components not shown in FIG. 3.

For example, mobile computing device 4 may include a battery to provide power to the components of mobile computing device 4. Similarly, the components of mobile computing device 4 shown in FIG. 3 may not be necessary in every example of mobile computing device 4. For example, in some configurations, mobile computing device 4 may not include communication units 22.

As shown in the example of FIG. 3, mobile computing device 4 includes one or more processors 20, one or more input components 8, one or more communication units 22, one or more output components 6, one or more sensors 26, and one or more storage devices 38. Input components 8 may include a radio input component 30. Further, output components 6 may include radio output component 34 and ultrasonic output component 36.

Output components 6, in some examples, are configured to provide output to a user using tactile, audio, or video stimuli. Output components 6, in one example, include an electronic display, a loudspeaker, or any other type of device for converting a signal into an appropriate form understandable to humans or machines. The electronic display may be an LCD or OLED part of a touch screen, may be a non-touchscreen direct view display component such as a CRT, LED, LCD, or OLED. The display component may also be a projector instead of a direct view display. Output components 6 may also include a structure capable of outputting a radio signal (e.g., radio output component 34) and a structure capable of outputting an ultrasonic pulse (e.g., ultrasonic output component 36). For instance, radio output component 34 may comprise an RF modulator, an RF transmitter, a radio antenna (either external or internal), a signal generator, or a radio amplifier, among other things. Further, ultrasonic output component 36 may comprise an ultrasonic transponder, an ultrasonic transducer, an ultrasonic sensor, or an ultrasonic transmitter, among other things.

Input components 8, in some examples, is configured to receive input from a user through tactile, audio, or video feedback. Examples of input components 8 include a display component, a mouse, a keyboard, a camera, a microphone or any other type of device for detecting input from a user. In some examples, a display component includes a touch-sensitive screen. Input component 8 may also include a structure capable of receiving a radio signal (e.g., radio input component 30). For instance, radio input component 30 may comprise a radio antenna, a radio receiver, a communication receiver, or a scanner, among other things.

One or more storage devices 38 of mobile computing device 4 include location module 40. One or more storage devices 38 may be configured to store information within mobile computing device 4 during operation. Storage device 38, in some examples, is described as a computer-readable storage medium. In some examples, storage device 38 is a temporary memory, meaning that a primary purpose of storage device 38 is not long-term storage. Storage device 38, in some examples, is described as a volatile memory, meaning that storage device 38 does not maintain stored contents when the computing device is turned off. Examples of volatile memories include random access memories (RAM), dynamic random access memories (DRAM), static random access memories (SRAM), and other forms of volatile memories known in the art. In some examples, storage device 38 is used to store program instructions for execution by processors 20.

Storage devices 38, in some examples, also include one or more computer-readable storage media. Storage devices 38 may be configured to store larger amounts of information than volatile memory. Storage devices 38 may further be configured for long-term storage of information. In some examples, storage devices 38 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Communication channels 28 may interconnect each of the components 20, 22, 8, 6, 26, 30, 34, 36, 38, and 40 for inter-component communications (physically, communicatively, and/or operatively). In some examples, communication channels 28 may include a system bus, a network connection, an inter-process communication data structure, or any other method for communicating data.

One or more communication units 22 of mobile computing device 4 may communicate with external devices, such as a server device, via one or more wired and/or wireless networks by transmitting and/or receiving network signals on the one or more networks. Communication units 22 may include a network interface card, such as an Ethernet card, an optical transceiver, a radio frequency transceiver, or any other type of device that can send and receive information. Examples of such network interfaces may include Bluetooth, infrared signaling, 3G, LIT, and Wi-Fi radios as well as Universal Serial Bus (USB) and Ethernet. In some examples, mobile computing device 4 utilizes communication units 22 to wirelessly communicate with another computing device that is operably coupled to mobile computing device 4.

One or more processors 20, in one example, are configured to implement functionality and/or process instructions for execution within mobile computing device 4. For example, processors 20 may be capable of processing instructions stored in storage device 38. Examples of processors 20 may include, any one or more of a microprocessor, a controller, a digital signal processor (DSP), an application specific integrated circuit (ASIC), a field-programmable gate array (FPGA), or equivalent discrete or integrated logic circuitry.

In some examples, mobile computing device 4 may include one or more sensors 26. One or more of sensors 26 may measure one more measurands. Examples of one or more of sensors 26 may include one or more position sensors (e.g., a global positioning system (GPS) sensor, an indoor positioning sensor, or the like), one or more motion/orientation sensors (e.g., an accelerometer, a gyroscope), a light sensor, a temperature sensor, a pressure (or grip) sensor, a physical switch, a proximity sensor, and one or more biosensors that can measure properties of the skin/blood, such as alcohol, blood sugar, heart rate, and/or perspiration level.

In accordance with techniques of this disclosure, location module 40 of mobile computing device 4 may output, using radio output component 34, a first radio signal that includes a first data packet. The first data packet may include information indicating that mobile computing device 4 is requesting initiation of a ranging operation. In some examples, the first data packet activates an ultrasonic transponder operatively connected to a beacon device that receives the first radio signal. In some instances, the first data packet may further include information identifying mobile computing device 4 as a source of the first data packet. In some examples, after outputting the first radio signal, location module 40 may activate ultrasonic output component 36. In some instances, the first radio signal is a Bluetooth low energy signal.

Location module 40 may, after outputting the first radio signal, output, using ultrasonic output component 36, an ultrasonic pulse that includes a second data packet. In some instances, the second data packet may further include information identifying mobile computing device 4 as a source of the second data packet. In some examples, after outputting the ultrasonic pulse, location module 40 may deactivate ultrasonic output component 36 in an effort to preserve battery life.

After outputting the ultrasonic pulse, location module 40 may, using radio input component 30, receive a third data packet via a second radio signal from the beacon device. The third data packet may include information identifying the beacon device as a source of the third data packet. In some examples, the third data packet may further include the information identifying mobile computing device 4. In such examples, location module 40 may verify that the third data packet is the data packet mobile computing device 4 is expecting to receive by comparing the information identifying mobile computing device 4 with the information contained in the second data packet. In some instances, the second radio signal is a Bluetooth low energy signal.

Location module 40 may determine a time difference between outputting the ultrasonic pulse and receiving the second radio signal. Based at least in part on the time difference and the third data packet, location module 40 may determine a location of mobile computing device 4. In determining the location, location module 40 may multiply the time difference by an output speed of the ultrasonic pulse (possibly determined using temperature and humidity information received in the third data packet) to determine a distance radius. For instance, if the output speed is 1,100 feet per second, and the time difference, after removing any possible random time delay indicated in the third data packet, is 25 milliseconds, then the distance radius may be equal to 27.5 feet. Using the information in the third data packet, location module 40 may determine a location of the beacon device. Based at least in part on the distance radius and the location of the beacon device, location module 40 may determine the location of mobile computing device 4. In this instance, the location may be within a 27.5 foot radius of the location of the beacon device that sent the third data packet.

In some instances, a more exact location can be determined using multiple beacons. For instance, after outputting the ultrasonic pulse, location module 40 may receive, using radio input component 30, a fourth data packet via a third radio signal from a second beacon device and a fifth data packet via a fourth radio signal from a third beacon device. Each of the fourth data packet and the fifth data packet may include information identifying the respective second beacon device and third beacon device as the respective source of the respective data packet. Location module 40 may repeat the steps performed above for finding distance radii from the second and third beacon device. In other words, location module 40 may determine a second time difference between outputting the ultrasonic pulse and receiving the third radio signal, multiply the second time difference by the output speed of the ultrasonic pulse to determine a second distance radius, determine a location of the second beacon device based at least in part on the information in the fourth data packet, and determine a certain radius that mobile computing device 4 is within of the second beacon device. Further, location module 40 may determine a third time difference between outputting the ultrasonic pulse and receiving the fourth radio signal, multiply the third time difference by the output speed of the ultrasonic pulse to determine a third distance radius, determine a location of the third beacon device based at least in part on the information in the fifth data packet, and determine a certain radius that mobile computing device 4 is within of the third beacon device. Using the first distance radius, the location of the first beacon device, the second distance radius, the location of the second beacon device, the third distance radius, and the location of the third beacon device, location module 40 may determine a location of mobile computing device 4. Specifically, through the use of trilateration, a single intersection point should be present, where the intersection point is the first distance radius away from the first beacon device, the second distance radius away from the second beacon device, and the third distance radius away from the third beacon device. This intersection point may be the location of mobile computing device 4. In other examples, each distance radius may include a range error, meaning that, rather than a single intersection point being present, a region of overlap is determined. In such examples, the location of mobile computing device 4 may be a point in the region of overlap, such as the centroid of that region.

In some instances, prior to outputting the first radio signal, mobile computing device 4 may need to request permission to perform the location techniques described herein. In such instances, location module 40 may send, using communication unit 22, a request to perform the ranging operation to a server device. Location module 40 may later receive, using communication unit 22 and from the server device, an indication that mobile computing device 4 may perform the ranging operation. In some instances, location module 40 may output, using radio output component 34, the first radio signal responsive to receiving said indication.

Figure 4:
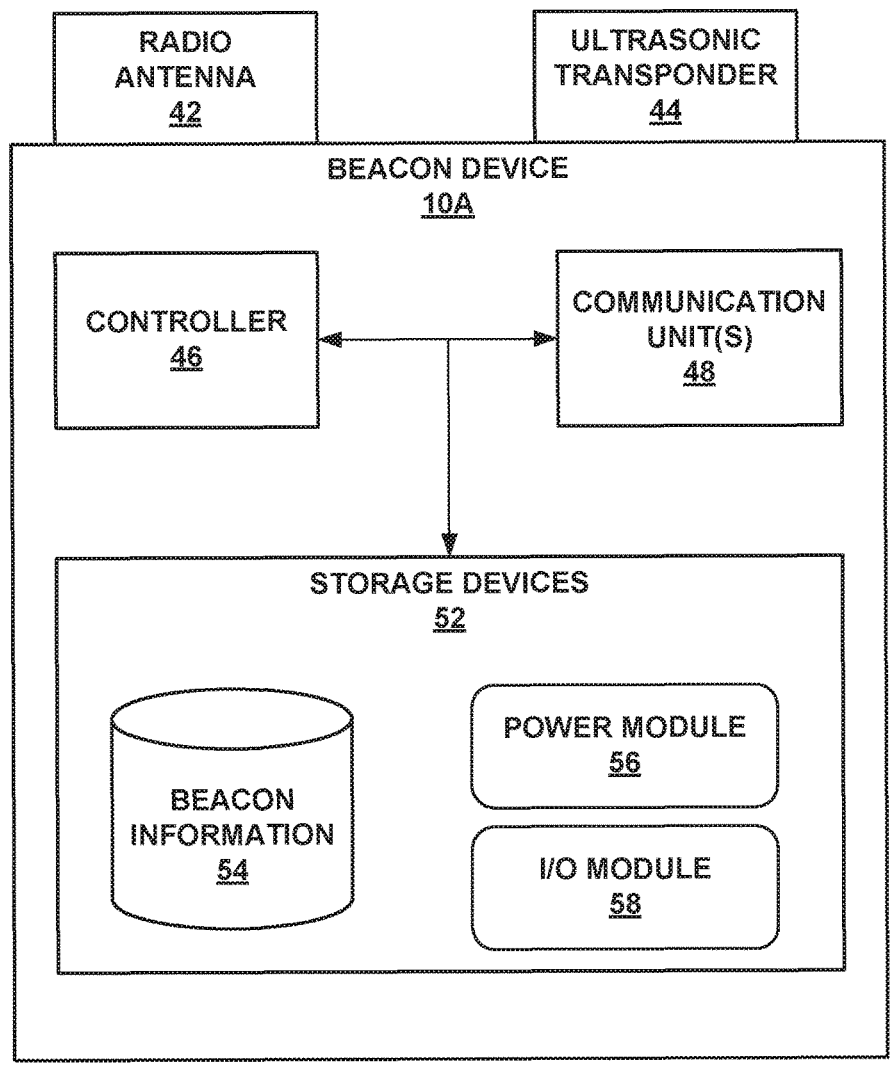
FIG. 4 is a block diagram illustrating an example beacon device, in accordance with one or more techniques of this disclosure.

FIG. 4 is a block diagram illustrating an example beacon device 10A, in accordance with one or more techniques of this disclosure. Beacon device 10A of FIG. 4 is described below within the context of one of beacon devices 10A-10C of FIGS. 1 and 2. FIG. 3 illustrates only one particular example of mobile computing device 4, and many other examples of beacon device 10A may be used in other instances and may include a subset of the components included in example beacon device 10A or may include additional components not shown in FIG. 3.

Beacon device 10A may include additional components that, for clarity, are not shown in FIG. 4. For example, beacon device 10A may include a battery to provide power to the components of beacon device 10A. Similarly, the components of beacon device 10A shown in FIG. 4 may not be necessary in every example of beacon device 10A. For example, in some configurations, beacon device 10A may not include communication unit 48.

As shown in the example of FIG. 4, beacon device 10A includes controller 46, one or more communication units 48, one or more storage devices 52, radio antenna 42, and ultrasonic transponder 44. Storage device 52 may further include beacon information 54, power module 56, and input/output (I/O) module 58.

Controller 46 may implement functionality and/or execute instructions within beacon device 10A. For example, controller 46 on beacon device 10A may receive and execute instructions stored by storage devices 52 that execute the functionality of network power module 56 and I/O module 58. These instructions executed by controller 46 may cause beacon device 10A to store information, within storage devices 52 during program execution. Controller 46 may execute instructions of power module 56 and I/O module 58 to cause controller 46 to process and transmit radio signals and ultrasonic pulses. That is, items in storage device 52, such as power module 56 and I/O module 58, may be operable by controller 46 to perform various actions, including causing radio antenna 42 and ultrasonic transponder 44 to process and transmit radio signals and ultrasonic pulses, as shown in FIGS. 1 and 2.

One or more communication units 48 of beacon device 10A may communicate with external devices, such as a server device, via one or more wired and/or wireless networks by transmitting and/or receiving network signals on the one or more networks. Communication unit 48 may be a network interface card, such as an Ethernet card, an optical transceiver, a radio frequency transceiver, or any other type of device that can send and receive information. Examples of such network interfaces may include Bluetooth, infrared signaling, 3G, LTE, and Wi-Fi radios as well as Universal Serial Bus (USB) and Ethernet. In some examples, beacon device 10A utilizes communication unit 48 to wirelessly communicate with another computing device that is operably coupled to beacon device 10A.

One or more storage devices 52 of mobile computing device 4 include beacon information 54, power module 56, and I/O module 58. One or more storage devices 52 may be configured to store information within mobile computing device 4 during operation. Storage device 52, in some examples, is described as a computer-readable storage medium. In some examples, storage device 52 is a temporary memory, meaning that a primary purpose of storage device 52 is not long-term storage. Storage device 52, in some examples, is described as a volatile memory, meaning that storage device 52 does not maintain stored contents when the computing device is turned off. Examples of volatile memories include random access memories (RAM), dynamic random access memories (DRAM), static random access memories (SRAM), and other forms of volatile memories known in the art. In some examples, storage device 52 is used to store program instructions for execution by controller 46.

Storage devices 52, in some examples, also include one or more computer-readable storage media. Storage devices 52 may be configured to store larger amounts of information than volatile memory. Storage devices 52 may further be configured for long-term storage of information. In some examples, storage devices 52 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. For instance, beacon information 54 of storage device 52 may include identifying information of beacon device 10A, such as an identification number, a name, and/or a location within the building.

Radio antenna 42 may consist of any component capable of inputting or outputting a radio signal. For instance, radio antenna 42 may comprise an RF modulator, an RF transmitter, a radio antenna (either external or internal), a signal generator, a radio amplifier, a radio receiver, a communication receiver, or a scanner, among other things. Further, ultrasonic transponder 44 may consist of any consist of any component capable of inputting or outputting an ultrasonic pulse. For instance, ultrasonic transponder 44 may comprise an ultrasonic transponder, an ultrasonic transducer, an ultrasonic sensor, or an ultrasonic transmitter, among other things.

In accordance with techniques of this disclosure, I/O module 58 of beacon device 10A may receive, using radio antenna 42, a first radio signal that includes a first data packet. The first radio signal may be output by a mobile computing device, such as mobile computing device 4 of FIG. 3. In such instances, beacon device 10A may be operatively connected to ultrasonic transponder 44, which may be deactivated. Further, the first data packet may include information that indicates that the mobile computing device is requesting initiation of a ranging operation.

Responsive to receiving the first radio signal that includes the first data packet, power module 56 may activate ultrasonic transponder 44. Once ultrasonic transponder 44 is activated, I/O module 58 may receive, using ultrasonic transponder 44, an ultrasonic pulse that includes a second data packet. The ultrasonic pulse may be output by the mobile computing device. In some examples, the second data packet may include information identifying the mobile computing device as the source of the second data packet.

Responsive to receiving the second data packet, I/O module 58 may output, using radio antenna 42, a third data packet via a second radio signal. The third data packet may include information identifying beacon device 10A as a source of the third data packet. In some examples, the information could include a geographical location of beacon device 10A, a name of beacon device 10A, a relative location of beacon device 10A, or an identification number of beacon device 10A. In some examples, the third data packet may further include the information identifying the mobile computing device. In some instances, after outputting the second radio signal, power module 56 may deactivate ultrasonic transponder 44.

Figure 5:
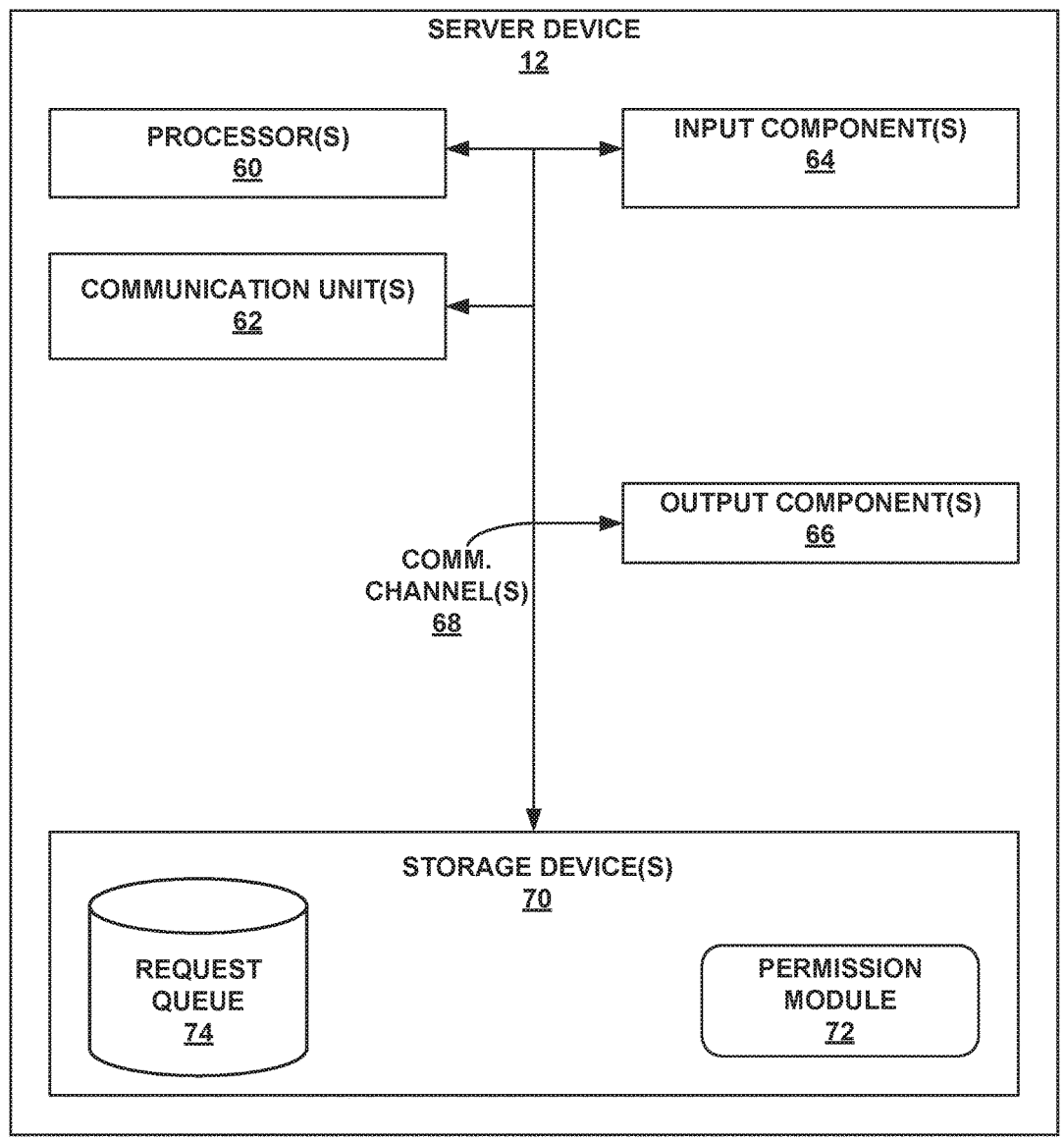
FIG. 5 is a block diagram illustrating an example server device, in accordance with one or more techniques of this disclosure.

FIG. 5 is a block diagram illustrating an example server device 12, in accordance with one or more techniques of this disclosure. Server device 12 of FIG. 5 in some examples represents an example of server 12 of FIGS. 1 and 2. FIG. 5 illustrates only one particular example of server device 12, and many other examples of server device 12 may be used in other instances and may include a subset of the components included in example server device 12 or may include additional components not shown in FIG. 5.

Server device 12 may include additional components that, for clarity, are not shown in FIG. 5. For example, server device 12 may include a battery to provide power to the components of server device 12. Similarly, the components of server device 12 shown in FIG. 5 may not be necessary in every example of server device 12. For example, in some configurations, server device 12 may not include input components 64.

As shown in the example of FIG. 5, server device 12 includes one or more processors 60, one or more input components 64, one or more communication units 62, one or more output components 66, and one or more storage devices 70. Storage device 70 may include permission module 72 and request queue 74.

Output component 66, in some examples, is configured to provide output to a user using tactile, audio, or video stimuli. Output component 66, in one example, includes an electronic display, a loudspeaker, or any other type of device for converting a signal into an appropriate form understandable to humans or machines. The electronic display may be an LCD or OLED part of a touch screen, may be a non-touchscreen direct view display component such as a CRT, LED, LCD, or OLED. The display component may also be a projector instead of a direct view display.

Input component 64, in some examples, is configured to receive input from a user through tactile, audio, or video feedback. Examples of input component 64 include a display component, a mouse, a keyboard, a camera, a microphone or any other type of device for detecting input from a user. In some examples, a display component includes a touch-sensitive screen.

One or more storage devices 70 of server device 12 include request queue 74 and permission module 72. One or more storage devices 70 may be configured to store information within server device 12 during operation. Storage device 70, in some examples, is described as a computer-readable storage medium. In some examples, storage device 70 is a temporary memory, meaning that a primary purpose of storage device 70 is not long-term storage. Storage device 70, in some examples, is described as a volatile memory, meaning that storage device 70 does not maintain stored contents when the computing device is turned off. Examples of volatile memories include random access memories (RAM), dynamic random access memories (DRAM), static random access memories (SRAM), and other forms of volatile memories known in the art. In some examples, storage device 70 is used to store program instructions for execution by processors 60. For instance, request queue 74 may be configured for short-term storage and temporarily hold identification information of mobile computing devices that have requested permission to perform a ranging operation until server device 12 grants the mobile computing device permission.

Storage devices 70, in some examples, also include one or more computer-readable storage media. Storage devices 70 may be configured to store larger amounts of information than volatile memory. Storage devices 70 may further be configured for long-term storage of information. In some examples, storage devices 70 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Communication channels 68 may interconnect each of the components 60, 62, 64, 66, 70, 74, and 72 for inter-component communications (physically, communicatively, and/or operatively). In some examples, communication channels 68 may include a system bus, a network connection, an inter-process communication data structure, or any other method for communicating data.

One or more communication units 62 of server device 12 may communicate with external devices, such as a server device, via one or more wired and/or wireless networks by transmitting and/or receiving network signals on the one or more networks. Communication unit 62 may be a network interface card, such as an Ethernet card, an optical transceiver, a radio frequency transceiver, or any other type of device that can send and receive information. Examples of such network interfaces may include Bluetooth, infrared signaling, 3G, LTE, and Wi-Fi radios as well as Universal Serial Bus (USB) and Ethernet. In some examples, server device 12 utilizes communication unit 62 to wirelessly communicate with another computing device that is operably coupled to server device 12, such as a mobile computing device.

One or more processors 60, in one example, are configured to implement functionality and/or process instructions for execution within server device 12. For example, processors 60 may be capable of processing instructions stored in storage device 70. Examples of processors 60 may include, any one or more of a microprocessor, a controller, a digital signal processor (DSP), an application specific integrated circuit (ASIC), a field-programmable gate array (FPGA), or equivalent discrete or integrated logic circuitry.

In accordance with techniques of this disclosure, permission module 72 may receive, using communication unit 62, a first request to perform a ranging operation from a first mobile computing device, such as mobile computing device 4 of FIG. 1. Responsive to receiving the first request, permission module 72 may place an indication of the first mobile computing device into request queue 74. For instance, the indication may be at least a portion of the information identifying the first mobile computing device. Permission module 72 may further receive, using communication unit 62, a second request to perform a ranging operation from a second mobile computing device, such as computing device 5 of FIG. 1. Responsive to receiving the second request, permission module 72 may place an indication of the second mobile computing device into request queue 74. For instance, the indication may be at least a portion of the information identifying the second mobile computing device.

Permission module 72 may determine a first starting time at which the first mobile computing device may perform the ranging operation. Further, permission module 72 may output, to the first mobile computing device using communication unit 62, a first indication that, at the first starting time, the first mobile computing device may perform the ranging operation. In some examples, after outputting the first indication, permission module 72 may receive, using communication unit 62, an indication from the first mobile computing device that the first mobile computing device has completed the ranging operation.

Permission module 72 may determine a second starting time at which the second computing device may perform the ranging operation. Further, permission module 72 may output, to the second mobile computing device using communication unit 62, a second indication that, at the second starting time, the second mobile computing device may perform the ranging operation. In some examples, the second starting time may be at least a predefined operational period after the first starting time. For instance, in certain non-limiting examples, the predefined operational period may be five seconds, such that the first mobile computing device has at least a window of five seconds to perform the ranging operation. In an example, permission module 72 may output the first indication at the first starting time to the first mobile computing device. After the predefined operational period has passed, permission module 72 may output the second indication at the second starting time to the second mobile computing device. In some examples, permission module 72 may output the second indication responsive to receiving the indication that the first mobile computing device has completed the ranging operation.

In some examples, the first request and the second request may include a coarse-grained location of the first mobile computing device and the second mobile computing device. In such examples, responsive to receiving the first request, permission module 72 of server device 12 may place an identifier of the first mobile computing device in a first area queue of a plurality of area queues. Each area queue may be associated with a distinct coarse-grained location, and the first area queue may be associated with the coarse-grained location included in the first request and the second request. Further, responsive to receiving the second request, permission module 72 of server device 12 may place an identifier of the second mobile computing device in the first area queue. Responsive to outputting the first indication, permission module 72 of server device 12 may dequeue the identifier of the first mobile computing device from the first area queue. Further, responsive to outputting the second indication, permission module 72 of server device 12 may dequeue the identifier of the second mobile computing device from the first area queue.

In some examples, permission module 72 of server device 12 may receive, from a first mobile computing device, a first request to perform a ranging operation. Permission module 72 of server device 12 may further receive, from a second mobile computing device, a second request to perform the ranging operation. Permission module 72 may determine a first starting time at which the first mobile computing device may perform the ranging operation. At the first starting time, permission module 72 may output, to the first mobile computing device, a first indication that the first mobile computing device may perform the ranging operation. After outputting the first indication, permission module 72 may receive, from the first mobile computing device, a second indication that the first mobile computing device has completed the ranging operation. Responsive to receiving the second indication, at a second starting time, permission module 72 may output, to the second mobile computing device, a third indication that the second mobile computing device may perform the ranging operation.

Figure 6:
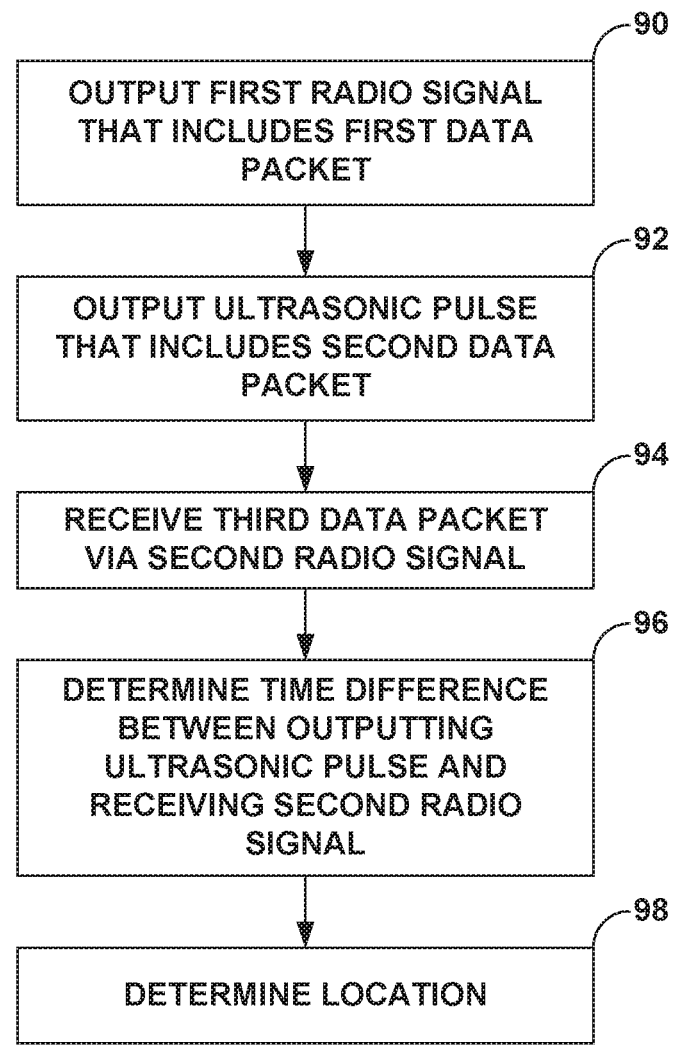
FIG. 6 is a flow diagram illustrating example operations of a mobile computing device that implements location techniques in accordance with one or more aspects of this disclosure.

FIG. 6 is a flow diagram illustrating example operations of a mobile computing device that implements location techniques in accordance with one or more aspects of this disclosure. The techniques of FIG. 6 may be performed by one or more processors of a computing device, such as mobile computing device 4 illustrated in FIG. 1, FIG. 2, and/or FIG. 3. For purposes of illustration only, the techniques of FIG. 6 are described within the context of mobile computing device 4 of FIG. 3, although computing devices having configurations different than that of mobile computing device 4 may perform the techniques of FIG. 6.

In accordance with techniques of this disclosure, a computing device (e.g., mobile computing device 4) may output (90), using a radio output component (e.g., radio output component 34 of FIG. 3), a first radio signal that includes a first data packet. The first data packet may include information indicating that mobile computing device 4 is requesting initiation of a ranging operation. In some examples, the first data packet activates an ultrasonic transponder (e.g., ultrasonic output component 36) operatively connected to a beacon device that receives the first radio signal. In some instances, the first data packet may further include information identifying mobile computing device 4 as a source of the first data packet. In some examples, after outputting the first radio signal, mobile computing device 4 may activate ultrasonic output component 36. In some instances, the first radio signal is a Bluetooth low energy signal.

Mobile computing device 4 may, after outputting the first radio signal, output, using (92) ultrasonic output component 36, an ultrasonic pulse that includes a second data packet. In some instances, the second data packet may further include information identifying mobile computing device 4 as a source of the second data packet. In some examples, after outputting the ultrasonic pulse, mobile computing device 4 may deactivate ultrasonic output component 36 in an effort to preserve battery life.

After outputting the ultrasonic pulse, mobile computing device 4 may, using a radio input component (e.g., radio input component 30), receive (94) a third data packet via a second radio signal from the beacon device. The third data packet may include information identifying the beacon device as a source of the third data packet, a temperature of an environment associated with the beacon device, a humidity of the environment associated with the beacon device, and a random time delay for processing the second data packet at the beacon device. In some examples, the third data packet may further include the information identifying mobile computing device 4. In such examples, mobile computing device 4 may verify that the third data packet is the data packet mobile computing device 4 is expecting to receive by comparing the information identifying mobile computing device 4 with the information contained in the second data packet. In some instances, the second radio signal is a Bluetooth low energy signal.

Mobile computing device 4 may determine (96) a time difference between outputting the ultrasonic pulse and receiving the second radio signal. Based at least in part on the time difference and the third data packet, mobile computing device 4 may determine (98) a location of mobile computing device 4. In determining the location, mobile computing device 4 may multiply the time difference by an output speed of the ultrasonic pulse to determine a distance radius. For instance, if the output speed is 1,100 feet per second (as determined using the air temperature and humidity included in the third data packet), and the time difference is 25 milliseconds (after factoring in the random delay included in the third data packet), then the distance radius may be equal to 27.5 feet. Using the information in the third data packet, mobile computing device 4 may determine a location of the beacon device. Based at least in part on the distance radius and the location of the beacon device, mobile computing device 4 may determine the location of mobile computing device 4. In certain non-limiting examples, the location may be within a 27.5 foot radius of the location of the beacon device that sent the third data packet.

In some instances, a more exact location can be determined using multiple beacons. For instance, after outputting the ultrasonic pulse, mobile computing device 4 may receive, using radio input component 30, a fourth data packet via a third radio signal from a second beacon device and a fifth data packet via a fourth radio signal from a third beacon device. Each of the fourth data packet and the fifth data packet may include information identifying the respective second beacon device and third beacon device as the respective source of the respective data packet. Mobile computing device 4 may repeat the steps performed above for finding distance radii from the second and third beacon device. In other words, mobile computing device 4 may determine a second time difference between outputting the ultrasonic pulse and receiving the third radio signal, multiply the second time difference by the output speed of the ultrasonic pulse to determine a second distance radius, determine a location of the second beacon device based at least in part on the information in the fourth data packet, and determine a certain radius that mobile computing device 4 is within of the second beacon device.

Further, mobile computing device 4 may determine a third time difference between outputting the ultrasonic pulse and receiving the fourth radio signal, multiply the third time difference by the output speed of the ultrasonic pulse to determine a third distance radius, determine a location of the third beacon device based at least in part on the information in the fifth data packet, and determine a certain radius that mobile computing device 4 is within of the third beacon device. Using the first distance radius, the location of the first beacon device, the second distance radius, the location of the second beacon device, the third distance radius, and the location of the third beacon device, mobile computing device 4 may determine a location of mobile computing device 4. Specifically, through the use of trilateration, a single intersection point should be present, where the intersection point is the first distance radius away from the first beacon device, the second distance radius away from the second beacon device, and the third distance radius away from the third beacon device. This intersection point may be the location of mobile computing device 4. In other examples, each distance radius may include a range error, meaning that, rather than a single intersection point being present, a region of overlap is determined. In such examples, the location of mobile computing device 4 may be a point in the region of overlap, such as the centroid of that region.

In some instances, prior to outputting the first radio signal, mobile computing device 4 may need to request permission to perform the location techniques described herein. In such instances, mobile computing device 4 may send, using a communication unit (e.g., communication unit 22), a request to perform the ranging operation to a server device. Mobile computing device 4 may later receive, using communication unit 22 and from the server device, an indication that mobile computing device 4 may perform the ranging operation. In some instances, mobile computing device 4 may output, using radio output component 34, the first radio signal responsive to receiving said indication.

Figure 7:
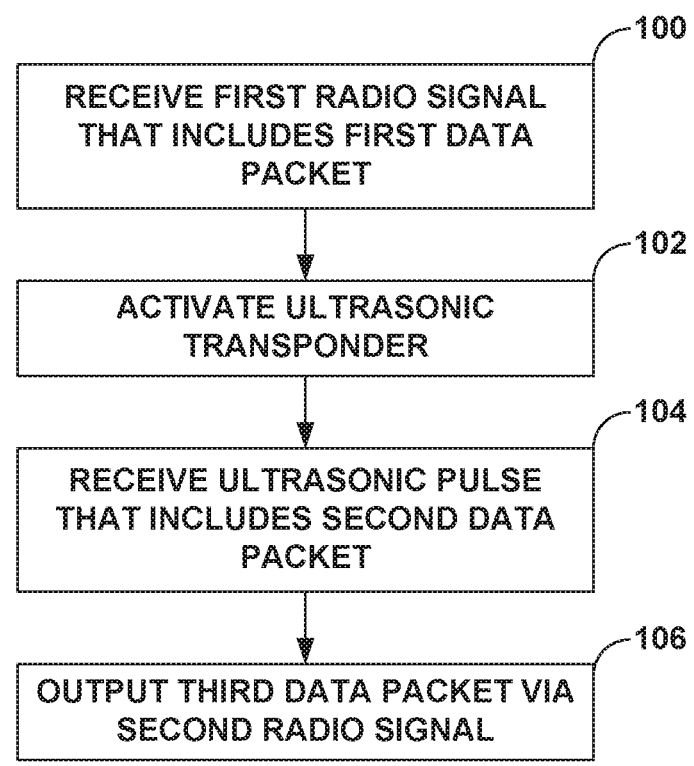
FIG. 7 is a flow diagram illustrating example operations of a beacon device that implements location techniques in accordance with one or more aspects of this disclosure.

FIG. 7 is a flow diagram illustrating example operations of a beacon device that implements location techniques in accordance with one or more aspects of this disclosure. The techniques of FIG. 7 may be performed by one or more processors of a computing device, such as beacon device 10A illustrated in FIG. 1, FIG. 2, and FIG. 4. For purposes of illustration, the techniques of FIG. 7 are described within the context of beacon device 10A of FIG. 4, although computing devices having configurations different than that of beacon device 10A may perform the techniques of FIG. 7.

In accordance with techniques of this disclosure, a beacon device (e.g., beacon device 10A) may receive (100), using a radio antenna (e.g., radio antenna 42), a first radio signal that includes a first data packet. The first radio signal may be output by a mobile computing device, such as mobile computing device 4 of FIG. 3. In such instances, beacon device 10A may be operatively connected to an ultrasonic transponder (e.g., ultrasonic transponder 44), which may be deactivated. Further, the first data packet may include information that indicates that the mobile computing device is requesting initiation of a ranging operation.

Responsive to receiving the first radio signal that includes the first data packet, beacon device 10A may activate (102) ultrasonic transponder 44. Once ultrasonic transponder 44 is activated, beacon device 10A may receive (104), using ultrasonic transponder 44, an ultrasonic pulse that includes a second data packet. The ultrasonic pulse may be output by the mobile computing device. In some examples, the second data packet may include information identifying the mobile computing device as the source of the second data packet.

Responsive to receiving the second data packet, beacon device 10A may output (106), using radio antenna 42, a third data packet via a second radio signal. The third data packet may include information identifying beacon device 10A as a source of the third data packet. In some examples, the information could include a geographical location of beacon device 10A, a name of beacon device 10A, a relative location of beacon device 10A, or an identification number of beacon device 10A. In some examples, the data packet may further include a temperature of the environment around beacon device 10A, a humidity of the environment around beacon device 10A, or a random time delay at beacon device 10A. In some examples, the third data packet may further include the information identifying the mobile computing device. In some instances, after outputting the second radio signal, beacon device 10A may deactivate ultrasonic transponder 44.

Figure 8:
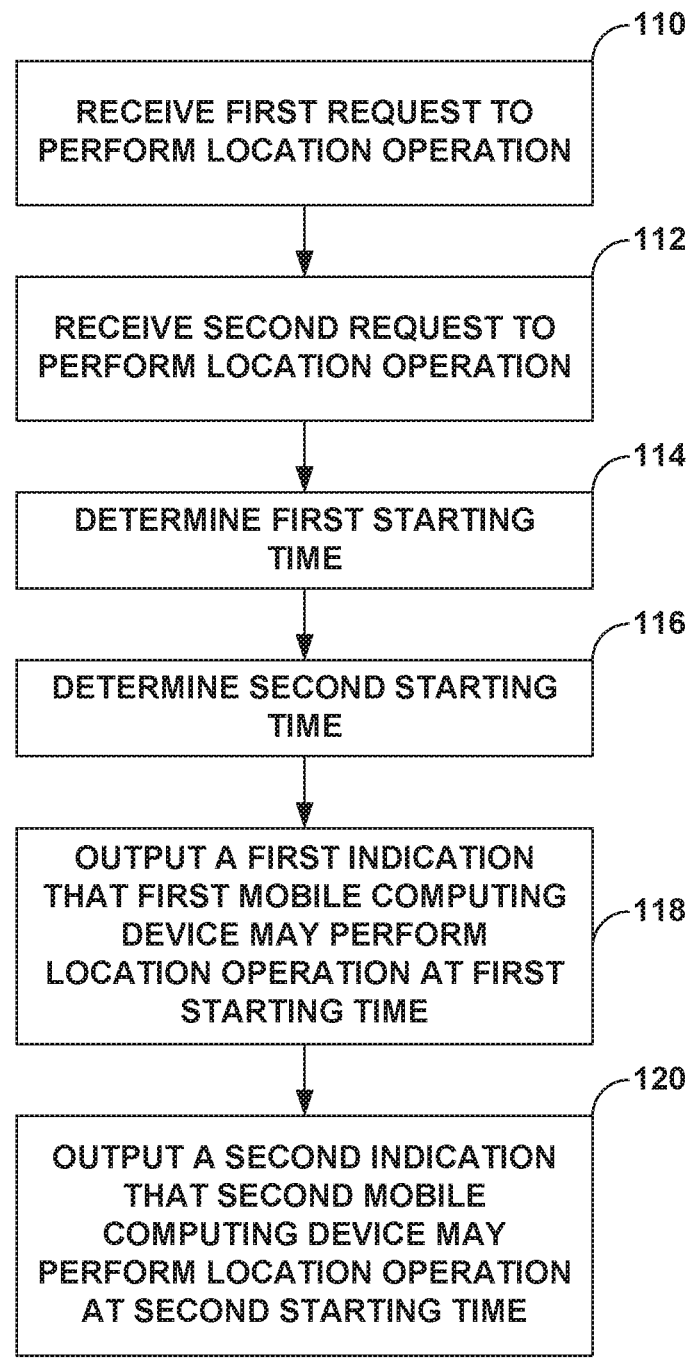
FIG. 8 is a flow diagram illustrating example operations of a server device that implements location techniques in accordance with one or more aspects of this disclosure.

FIG. 8 is a flow diagram illustrating example operations of a server device that implements location techniques in accordance with one or more aspects of this disclosure. The techniques of FIG. 8 may be performed by one or more processors of a computing device, such as server device 12 illustrated in FIG. 1, and FIG. 5. For purposes of illustration, the techniques of FIG. 8 are described within the context of server device 12 of FIG. 5, although computing devices having configurations different than that of server device 12 may perform the techniques of FIG. 8.

In accordance with techniques of this disclosure, a server device (e.g., server device 12) may receive (110), using a communication unit (e.g., communication unit 62), a first request to perform a ranging operation from a first mobile computing device, such as mobile computing device 4 of FIG. 1. Responsive to receiving the first request, server device 12 may place an indication of the first mobile computing device into a request queue (e.g., request queue 74). Server device 12 may further receive (112), using communication unit 62, a second request to perform a ranging operation from a second mobile computing device, such as computing device 5 of FIG. 1. Responsive to receiving the second request, server device 12 may place an indication of the second mobile computing device into request queue 74.

In some examples, to achieve scalability, the requests to server device 12 may include a coarse-grained location. The coarse-grained location may be determined through use of a GPS, a cellular tower RSSI, or a WiFi RSSI. This may allow server device 12 to maintain a queue of requests for a particular region. As such, server device 12 may maintain a queue for a region, a city, a neighborhood, or a tile of a map. Further, if beacon devices in this system periodically transmit a unique Bluetooth identification, the beacons themselves may provide a way of indicating a coarse-grained location.

Server device 12 may determine (114) a first starting time at which the first mobile computing device may perform the ranging operation. Server device 12 may determine (116) a second starting time at which the second computing device may perform the ranging operation.

Server device 12 may output (118), to the first mobile computing device using communication unit 62, a first indication that, at the first starting time, the first mobile computing device may perform the ranging operation. In some examples, after outputting the first indication, server device 12 may receive, using communication unit 62, an indication from the first mobile computing device that the first mobile computing device has completed the ranging operation.

Further, server device 12 may output (120), to the second mobile computing device using communication unit 62, a second indication that, at the second starting time, the second mobile computing device may perform the ranging operation. In some examples, the second starting time may be at least a predefined operational period after the first starting time. For instance, the predefined operational period may be five seconds, such that the first mobile computing device has at least a window of five seconds to perform the ranging operation. In an example, server device 12 may output the first indication at the first starting time to the first mobile computing device. After the predefined operational period has passed, server device 12 may output the second indication at the second starting time to the second mobile computing device. In some examples, server device 12 may output the second indication responsive to receiving the indication that the first mobile computing device has completed the ranging operation.

In some examples, the first request and the second request may include a coarse-grained location of the first mobile computing device and the second mobile computing device. In such examples, responsive to receiving the first request, server device 12 may place an identifier of the first mobile computing device in a first area queue of a plurality of area queues. Each area queue may be associated with a distinct coarse-grained location, and the first area queue may be associated with the coarse-grained location included in the first request and the second request. Further, responsive to receiving the second request, server device 12 may place an identifier of the second mobile computing device in the first area queue. Responsive to outputting the first indication, server device 12 may dequeue the identifier of the first mobile computing device from the first area queue. Further, responsive to outputting the second indication, server device 12 may dequeue the identifier of the second mobile computing device from the first area queue.

In some examples, server device 12 may receive, from a first mobile computing device, a first request to perform a ranging operation. Server device 12 may further receive, from a second mobile computing device, a second request to perform the ranging operation. Server device 12 may determine a first starting time at which the first mobile computing device may perform the ranging operation. At the first starting time, server device 12 may output, to the first mobile computing device, a first indication that the first mobile computing device may perform the ranging operation. After outputting the first indication, server device 12 may receive, from the first mobile computing device, a second indication that the first mobile computing device has completed the ranging operation. Responsive to receiving the second indication, at a second starting time, server device 12 may output, to the second mobile computing device, a third indication that the second mobile computing device may perform the ranging operation.

EXAMPLE 1

A method comprising: outputting, by a mobile computing device, a first radio signal that includes a first data packet, wherein the first data packet includes information indicating that the mobile computing device is requesting initiation of a ranging operation; after outputting the first radio signal, outputting, by the mobile computing device, an ultrasonic pulse that includes a second data packet; after outputting the ultrasonic pulse, receiving, by the mobile computing device, a third data packet via a second radio signal from a beacon device, wherein the third data packet includes information identifying the beacon device as a source of the third data packet; determining, by the mobile computing device, a time difference between outputting the ultrasonic pulse and receiving the second radio signal; and determining, by the mobile computing device and based at least in part on the third data packet and the time difference, a location of the mobile computing device.

EXAMPLE 2

The method of example 1, wherein the first data packet activates an ultrasonic transponder operatively connected to the beacon device.

EXAMPLE 3

The method of any of examples 1-2, further comprising: prior to outputting the first radio signal: sending, by the mobile computing device, a request to perform the ranging operation to a server device; and receiving, by the mobile computing device and from the server device, an indication that the mobile computing device may perform the ranging operation.

EXAMPLE 4

The method of example 3, wherein outputting the first radio signal comprises outputting the first radio signal responsive to receiving the indication that the mobile computing device may perform the ranging operation from the server device.

EXAMPLE 5

The method of any of examples 1-4, wherein determining the location of the mobile computing device comprises: multiplying, by the computing device, the time difference by an output speed of the ultrasonic pulse to determine a distance radius; determining, by the computing device, a location of the beacon device based at least in part on the information in the third data packet; and determining, by the computing device, the location of the mobile computing device based at least in part on the distance radius and the location of the beacon device.

EXAMPLE 6

The method of example 5, wherein the beacon device is a first beacon device, the method further comprising: after outputting the ultrasonic pulse, receiving, by the mobile computing device, a fourth data packet via a third radio signal from a second beacon device, wherein the fourth data packet includes information identifying the second beacon device as a source of the fourth data packet; after outputting the ultrasonic pulse, receiving, by the mobile computing device, a fifth data packet via a fourth radio signal from a third beacon device, wherein the fifth data packet includes information identifying the third beacon device as a source of the fifth data packet; determining, by the mobile computing device, a second time difference between outputting the ultrasonic pulse and receiving the third radio signal; determining, by the mobile computing device, a third time difference between outputting the ultrasonic pulse and receiving the fourth radio signal; multiplying, by the computing device, the second time difference by the output speed of the ultrasonic pulse to determine a second distance radius; multiplying, by the computing device, the third time difference by the output speed of the ultrasonic pulse to determine a third distance radius; determining, by the computing device, a location of the second beacon device based at least in part on the information in the fourth data packet; and determining, by the computing device, a location of the third beacon device based at least in part on the information in the fifth data packet, wherein determining the location of the mobile computing device comprises determining, by the computing device, the location of the mobile computing device based at least on the first distance radius, the location of the first beacon device, the second distance radius, the location of the second beacon device, the third distance radius, and the location of the third beacon device.

EXAMPLE 7

The method of any of examples 1-6, wherein the first data packet and the second data packet further include information identifying the mobile computing device as a source of the first data packet and the second data packet and a coarse-grained location of the mobile computing device.

EXAMPLE 8

The method of any of examples 1-7, wherein the first radio signal and the second radio signal are Bluetooth low energy signals.

EXAMPLE 9

The method of any of examples 1-8, wherein the mobile computing device comprises a radio antenna and an ultrasonic transponder.

EXAMPLE 10

The method of example 9, further comprising: after outputting the first radio signal, activating the ultrasonic transponder; and after outputting the ultrasonic pulse, deactivating the ultrasonic transponder.

EXAMPLE 11

The method of any of examples 1-10, wherein the second data packet includes information identifying the mobile computing device as the source of the second data packet, and wherein the third data packet further includes the information identifying the mobile computing device, a temperature of an environment associated with the beacon device, a humidity of the environment associated with the beacon device, and a random time delay for processing the second data packet at the beacon device.

EXAMPLE 12

A method comprising: receiving, by a beacon device using a radio antenna, a first radio signal that includes a first data packet, wherein the first radio signal is output by a mobile computing device, and wherein the first data packet includes information indicating that the mobile computing device is requesting initiation of a ranging operation; responsive to receiving the first radio signal that includes the first data packet, activating, by the beacon device, an ultrasonic transponder; receiving, by the beacon device using the ultrasonic transponder, an ultrasonic pulse that includes a second data packet, wherein the ultrasonic pulse is output by the mobile computing device; and responsive to receiving the second data packet, outputting, by the beacon device using the radio antenna, a third data packet via a second radio signal, wherein the third data packet includes information identifying the beacon device as a source of the third data packet.

EXAMPLE 13

The method of example 12, wherein the third data packet further includes a geographical location of the beacon device, a temperature of an environment around the beacon device, a humidity of the environment around the beacon device, and a random time delay for processing the second data packet at the beacon device.

EXAMPLE 14

The method of any of examples 12-13, further comprising: after outputting the second radio signal, deactivating, by the beacon device, the ultrasonic transponder.

EXAMPLE 15

The method of any of examples 12-14, wherein the second data packet further includes information identifying the mobile computing device as the source of the second data packet, and wherein the third data packet further includes the information identifying the mobile computing device.

EXAMPLE 16

A method comprising: receiving, by a server device and from a first mobile computing device, a first request to perform a ranging operation; receiving, by the service device and from a second mobile computing device, a second request to perform the ranging operation; determining, by the server device, a first starting time at which the first mobile computing device may perform the ranging operation; determining, by the server device, a second starting time at which the second mobile computing device may perform the ranging operation, wherein the second starting time is later than the first starting time; outputting, by the server device and to the first mobile computing device, a first indication that, at the first starting time, the first mobile computing device may perform the ranging operation; and outputting, by the server device and to the second mobile computing device, a second indication that, at the second starting time, the second mobile computing device may perform the ranging operation.

EXAMPLE 17

The method of example 16, wherein the second starting time is at least a predefined operational period after the first starting time.

EXAMPLE 18

The method of any of examples 17-18, further comprising: outputting, by the server device and to the first mobile computing device, the first indication at the first starting time; and after the predefined operational period has passed, outputting, by the server device and to the second mobile computing device, the second indication at the second starting time.

EXAMPLE 19

The method of any of examples 16-18, wherein the first request and the second request include a coarse-grained location of the first mobile computing device and the second mobile computing device, wherein the coarse-grained location for the first mobile computing device is the same as the coarse-grained location for the second mobile computing device, wherein the method further comprises: responsive to receiving the first request, storing, by the server device, an identifier of the first mobile computing device in a first area queue of a plurality of area queues, wherein each area queue is associated with a distinct coarse-grained location, and wherein the first area queue is associated with the coarse-grained location included in the first request and the coarse-grained location included in the second request; responsive to receiving the second request, storing, by the server device, an identifier of the second mobile computing device in the first area queue; responsive to outputting the first indication, dequeueing, by the server device, the identifier of the first mobile computing device from the first area queue; and responsive to outputting the second indication, dequeueing, by the server device, the identifier of the second mobile computing device from the first area queue.

EXAMPLE 20

A method comprising: receiving, by a server device and from a first mobile computing device, a first request to perform a ranging operation; receiving, by the service device and from a second mobile computing device, a second request to perform the ranging operation; determining, by the server device, a first starting time at which the first mobile computing device may perform the ranging operation; at the first starting time, outputting, by the server device and to the first mobile computing device, a first indication that the first mobile computing device may perform the ranging operation; after outputting the first indication, receiving, by the server device and from the first mobile computing device, a second indication that the first mobile computing device has completed the ranging operation; and responsive to receiving the second indication, at a second starting time, outputting, by the server device and to the second mobile computing device, a third indication that the second mobile computing device may perform the ranging operation.

EXAMPLE 21

A mobile computing device configured to perform any of the methods of examples 1-11.

EXAMPLE 22

A computer-readable storage medium comprising instructions that, when executed, cause at least one processor of a computing device to perform any of the methods of examples 1-11.

EXAMPLE 23

A mobile computing apparatus comprising means for performing any of the methods of examples 1-11.

EXAMPLE 24

A beacon device configured to perform any of the methods of examples 12-15.

EXAMPLE 25

A computer-readable storage medium comprising instructions that, when executed, cause at least one processor of a computing device to perform any of the methods of examples 12-15.

EXAMPLE 26

A beacon apparatus comprising means for performing any of the methods of examples 12-15.

EXAMPLE 27

A server device configured to perform any of the methods of examples 16-20.

EXAMPLE 28

A computer-readable storage medium comprising instructions that, when executed, cause at least one processor of a computing device to perform any of the methods of examples 16-20.

EXAMPLE 29

A server apparatus comprising means for performing any of the methods of examples 16-20.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A mobile computing device comprising:
an ultrasonic transponder;
a radio antenna; and
one or more processors configured to:
output, via the radio antenna, a first radio signal that includes first data, wherein the first data includes information indicating that the mobile computing device is requesting initiation of a ranging operation performed by the mobile computing device to determine a location of the mobile computing device;
after outputting the first radio signal, output, via the ultrasonic transponder, an ultrasonic pulse that includes second data;
after outputting the ultrasonic pulse, receive, via the radio antenna, from a beacon device, a second radio signal that includes third data, wherein the third data includes information identifying the beacon device as a source of the third data;
determine a time difference between outputting the ultrasonic pulse and receiving the second radio signal; and
determine, based at least in part on the third data and the tide difference, the location of the mobile computing device.

2. The mobile computing device of claim 1, wherein the first data activates an ultrasonic transponder operatively connected to the beacon device.

3. The mobile computing device of claim 1, wherein the one or more processors are further configured to:
prior to outputting the first radio signal:
send, to a server device, a request to perform the ranging operation; and
receive, from the server device, an indication that the mobile computing device is authorized to perform the ranging operation.

4. The mobile computing device of claim 3, wherein the one or more processors being configured to output the first radio signal comprises the one or more processors being configured to output, via the radio antenna, the first radio signal in response to receiving the indication that the mobile computing device is authorized to perform the ranging operation from the server device.

5. The mobile computing device of claim 1, wherein the one or more processors being configured to determine the location of the mobile computing device comprises the one or more processors being configured to:
determine, based on the time difference and an output speed of the ultrasonic pulse, a distance radius;
determine a location of the beacon device based at least in part on the information in the third data; and
determine, based at least in part on the distance radius and the location of the beacon device, the location of the mobile computing device.

6. The mobile computing device of claim 5, wherein the beacon device is a first beacon device, wherein the one or more processors are further configured to determine the location of the mobile computing device by at least:
after outputting the ultrasonic pulse, receiving, via the radio antenna, a third radio signal that includes fourth data from a second beacon device, wherein the fourth data includes information identifying the second beacon device as a source of the fourth data;
after outputting the ultrasonic pulse, receiving, via the radio antenna, a fourth radio signal that includes fifth data from a third beacon device, wherein the fifth data includes information identifying the third beacon device as a source of the fifth data;
determining a second time difference between outputting the ultrasonic pulse and receiving the third radio signal;
determining a third time difference between outputting the ultrasonic pulse and receiving the fourth radio signal;
determining, based on the second time difference and the output speed of the ultrasonic pulse, a second distance radius;
determining, based on the third time difference and the output speed of the ultrasonic pulse, a third distance radius;

determining, based at least in part on the information in the fourth data, a location of the second beacon device;
determining, based at least in part on the information in the fifth data, a location of the third beacon device; and
determining, based at least on the first distance radius, the location of the first beacon device, the second distance radius, the location of the second beacon device, the third distance radius, and the location of the third beacon device, the location of the mobile computing device.

7. The mobile computing device of claim 1, wherein the first data and the second data further include information identifying the mobile computing device as a source of the first data and the second data and a coarse-grained location of the mobile computing device.

8. The mobile computing device of claim 1, wherein the first radio signal and the second radio signal are low energy signals.

9. The mobile computing device of claim 1, wherein the one or more processors are further configured to:
after outputting the first radio signal, activate the ultrasonic transponder; and
after outputting the ultrasonic pulse, deactivate the ultrasonic transponder.

10. The mobile computing device of claim 1, wherein the second data includes information identifying the mobile computing device as the source of the second data, and wherein the third data further includes the information identifying the mobile computing device, a temperature of an environment associated with the beacon device, a humidity of the environment associated with the beacon device, and a random time delay for processing the second data at the beacon device.

11. A beacon device comprising:
a deactivated ultrasonic transponder;
a radio antenna; and
one or more processors configured to:
receive, via the radio antenna from a mobile computing device, a first radio signal that includes first data, wherein the first data includes information indicating that the mobile computing device is requesting initiation of a ranging operation performed by the mobile computing device to determine a location of the mobile computing device;
responsive to receiving the first radio signal that includes the first data, activate the ultrasonic transponder;
receive, via the ultrasonic transponder, from the mobile computing device, an ultrasonic pulse that includes second data; and
responsive to receiving the second data, output, via the radio antenna, a second radio signal that includes third data, wherein the third data includes information identifying the beacon device as a source of the third data.

12. The beacon device of claim 11, wherein the third data further includes a geographical location of the beacon device, a temperature of an environment around the beacon device, a humidity of the environment around the beacon device, and a random time delay for processing the second data at the beacon device.

13. The beacon device of claim 11, wherein the one or more processors are further configured to:
after outputting the second radio signal, deactivate the ultrasonic transponder.

14. The beacon device of claim 11., wherein the second data further includes information identifying the mobile computing device as the source of the second data, and wherein the third data further includes the information identifying the mobile computing device.

15. A server device comprising:
a communication unit configured to:
receive, from a first mobile computing device, a first request to perform a ranging operation performed by the mobile computing device to determine a location of the mobile computing device; and
receive, from a second mobile computing device, a second request to perform the ranging operation; and
one or more processors configured to:
determine a first starting time at which the first mobile computing device is authorized to perform the ranging operation;
determine a second starting time at which the second mobile computing device is authorized to perform the ranging operation, wherein the second starting time is later than the first starting time;
output, via the communication unit and to the first mobile computing device, a first indication that, at the first starting time, the first mobile computing device is authorized to perform the ranging operation; and
output, via the communication unit and to the second mobile computing device, a second indication that, at the second starting time, the second mobile computing device is authorized to perform the ranging operation.

16. The server device of claim 15, wherein the second starting time is at least a predefined operational period after the first starting time.

17. The server device of claim 16, wherein the one or more processors are further configured to:
output, via the communication unit and to the first mobile computing device, the first indication at the first starting time; and
after the predefined operational period has passed, output, via the communication unit and to the second mobile computing device, the second indication at the second starting time.

18. The server device of claim 15, wherein the first request and the second request each include a coarse-grained location of the first mobile computing device and the second mobile computing device, wherein the coarse-grained location for the first mobile computing device is the same as the coarse-grained location for the second mobile computing device, wherein the one or more processors are further configured to:
responsive to receiving the first request, store an identifier of the first mobile computing device in a first area queue of a plurality of area queues, wherein each area queue is associated with a distinct coarse-grained location, and wherein the first area queue is associated with the coarse-grained location included in the first request and the coarse-grained location included in the second request;
responsive to receiving the second request, store an identifier of the second mobile computing device in the first area queue;
responsive to outputting the first indication, dequeue the identifier of the first mobile computing device from the first area queue; and
responsive to outputting the second indication, dequeue the identifier of the second mobile computing device from the first area queue.

19. A server device comprising:
a communication unit configured to:
  receive, from a first mobile computing device, a first request to perform a ranging operation performed by the mobile computing device to determine a location of the mobile computing device; and
  receive, from a second mobile computing device, a second request to perform the ranging operation; and
one or more processors configured to:
  determine a first starting time at which the first mobile computing device is authorized to perform the ranging operation;
  at the first starting time, output, via the communication unit and to the first mobile computing device, a first indication that the first mobile computing device is authorized to perform the ranging operation;
  after outputting the first indication, receive, via the communication unit and from the first mobile computing device, a second indication that the first mobile computing device has completed the ranging operation; and
  responsive to receiving the second indication, at a second starting time, output, via the communication unit and to the second mobile computing device, a third indication that the second mobile computing device is authorized to perform the ranging operation.

20. The server device of claim 19, wherein the first request and the second request each include a coarse-grained location of the first mobile computing device and the second mobile computing device, wherein the coarse-grained location for the first mobile computing device is the same as the coarse-grained location for the second mobile computing device, wherein the one or more processors are further configured to:
  responsive to receiving the first request, store an identifier of the first mobile computing device in a first area queue of a plurality of area queues, wherein each area queue is associated with a distinct coarse-grained location, and wherein the first area queue is associated with the coarse-grained location included in the first request and the coarse-grained location included in the second request;
  responsive to receiving the second request, store an identifier of the second mobile computing device in the first area queue;
  responsive to outputting the first indication, dequeue the identifier of the first mobile computing device from the first area queue; and
  responsive to outputting the second indication, dequeue the identifier of the second mobile computing device from the first area queue.

* * * * *